(12) United States Patent
Kerpez et al.

(10) Patent No.: US 10,708,793 B2
(45) Date of Patent: **\*Jul. 7, 2020**

(54) METHOD AND APPARATUS FOR IMPLEMENTING WIRELESS SYSTEM DISCOVERY AND CONTROL USING A STATE-SPACE

(71) Applicant: ASSIA SPE, LLC, Wilmington, DE (US)

(72) Inventors: Kenneth J. Kerpez, Long Valley, NJ (US); Wonjong Rhee, San Francisco, CA (US); Mung Chiang, Princeton, NJ (US); Ardavan Maleki Tehrani, Menlo Park, CA (US)

(73) Assignee: ASSIA SPE, LLC, Wilmington, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/290,094

(22) Filed: Mar. 1, 2019

(65) Prior Publication Data

US 2019/0200246 A1 Jun. 27, 2019

Related U.S. Application Data

(63) Continuation of application No. 14/779,942, filed as application No. PCT/US2013/033682 on Mar. 25, 2013, now Pat. No. 10,231,138.

(51) Int. Cl.
*H04W 84/12* (2009.01)
*H04W 24/02* (2009.01)
(Continued)

(52) U.S. Cl.
CPC ......... *H04W 24/02* (2013.01); *H04W 72/082* (2013.01); *H04W 72/085* (2013.01); *H04W 84/12* (2013.01); *H04W 88/08* (2013.01)

(58) Field of Classification Search
CPC . H04W 24/02; H04W 72/082; H04W 72/085; H04W 84/12; H04W 88/08; H04W 16/14; H04B 1/1027
(Continued)

(56) References Cited

U.S. PATENT DOCUMENTS

| 6,829,491 | B1* | 12/2004 | Yea | ....................... H04W 24/02 |
|---|---|---|---|---|
| | | | | 455/403 |
| 7,881,816 | B2* | 2/2011 | Mathiesen | ......... G05B 19/4185 |
| | | | | 340/12.54 |

(Continued)

FOREIGN PATENT DOCUMENTS

| GB | 2299916 A | 10/1996 |
|---|---|---|
| WO | 2010096031 A1 | 8/2010 |
| WO | 2012072445 A1 | 6/2012 |

OTHER PUBLICATIONS

International Search Report and Written Opinion dated Feb. 28, 2014, in International Patent Application No. PCT/US2013/033682 (15pgs).

(Continued)

*Primary Examiner* — Hai V Nguyen
(74) *Attorney, Agent, or Firm* — North Weber & Baugh LLP; Michael North

(57) ABSTRACT

In accordance with embodiments disclosed herein, there are provided apparatuses, systems and methods for implementing wireless system discovery and control using a state-space. For example, such means may include: establishing, a communications interface between an access point optimizer and a wireless access point; identifying one or more interfering wireless nodes exhibiting electromagnetic interference upon the wireless access point; collecting data from the wireless access point; determining a model of the wireless access point and the one or more interfering wireless nodes by: (i) modeling communicative relationships and
(Continued)

properties among the wireless access points and the one or more interfering wireless nodes exhibiting electromagnetic interference upon the wireless access point based at least in part on the data collected, and (ii) modeling an active state of the wireless access points representing a current configuration of the wireless access points having therein one or more configurable parameters for the wireless access points based at least in part on the data collected; and quantifying a change in performance of the wireless access points or the one or more interfering wireless nodes based on a state change affecting the model. Other related embodiments are disclosed.

20 Claims, 19 Drawing Sheets

(51) Int. Cl.
*H04W 72/08* (2009.01)
*H04W 88/08* (2009.01)

(58) Field of Classification Search
USPC .................................. 370/252; 455/62, 63.1
See application file for complete search history.

(56) References Cited

U.S. PATENT DOCUMENTS

| | | | | |
|---|---|---|---|---|
| 8,588,113 B2* | 11/2013 | Wu | ............... | H04W 72/082 370/278 |
| 8,615,597 B2* | 12/2013 | Misra | ............... | H04N 21/4516 709/232 |
| 8,964,606 B2* | 2/2015 | Liu | ............... | H04W 72/082 370/278 |
| 9,078,267 B2* | 7/2015 | Wu | ............... | H04W 72/0486 |
| 9,137,282 B2* | 9/2015 | Misra | ............... | H04N 21/4516 |
| 9,345,035 B2* | 5/2016 | Liu | ............... | H04W 72/082 |
| 9,749,780 B2* | 8/2017 | Huang | ............... | G01S 5/0252 |
| 9,967,757 B2* | 5/2018 | Tehrani | ............... | H04W 72/0426 |
| 10,231,138 B2* | 3/2019 | Kerpez | ............... | H04W 24/02 |
| 2008/0233967 A1 | 9/2008 | Montojo et al. | | |
| 2008/0247375 A1 | 10/2008 | Muharemovic et al. | | |
| 2010/0008316 A1* | 1/2010 | Liu | ............... | H04W 72/082 370/329 |
| 2010/0267408 A1 | 10/2010 | Lee et al. | | |
| 2012/0002733 A1* | 1/2012 | Misra | ............... | H04N 21/4516 375/259 |
| 2012/0309406 A1 | 12/2012 | Xu et al. | | |
| 2013/0203428 A1 | 8/2013 | Hwang | | |
| 2013/0317944 A1* | 11/2013 | Huang | ............... | G01S 5/0252 705/26.61 |
| 2014/0036845 A1* | 2/2014 | Liu | ............... | H04W 72/082 370/329 |
| 2014/0074982 A1* | 3/2014 | Misra | ............... | H04N 21/4516 709/217 |
| 2015/0117388 A1* | 4/2015 | Liu | ............... | H04W 72/082 370/329 |
| 2016/0066201 A1* | 3/2016 | Kerpez | ............... | H04W 24/02 370/252 |
| 2016/0309345 A1* | 10/2016 | Tehrani | ............... | H04W 72/0426 |

OTHER PUBLICATIONS

International Search Report and Written Opinion dated Nov. 28, 2014, in International Patent Application No. PCT/US2013/075874 (15pgs).
Office Action dated May 7, 2018, in European Patent Application No. 013715545 (8pgs).
Response filed Nov. 19, 2018, in European Patent Application No. 013715545 (5pgs).
Office Action dated Feb. 15, 2019, in European Patent Application No. 013715545 (6pgs).
The Examination Report dated Nov. 18, 2019, in the related European Application No. 13 715 545.3-1214, (7 pgs).

* cited by examiner

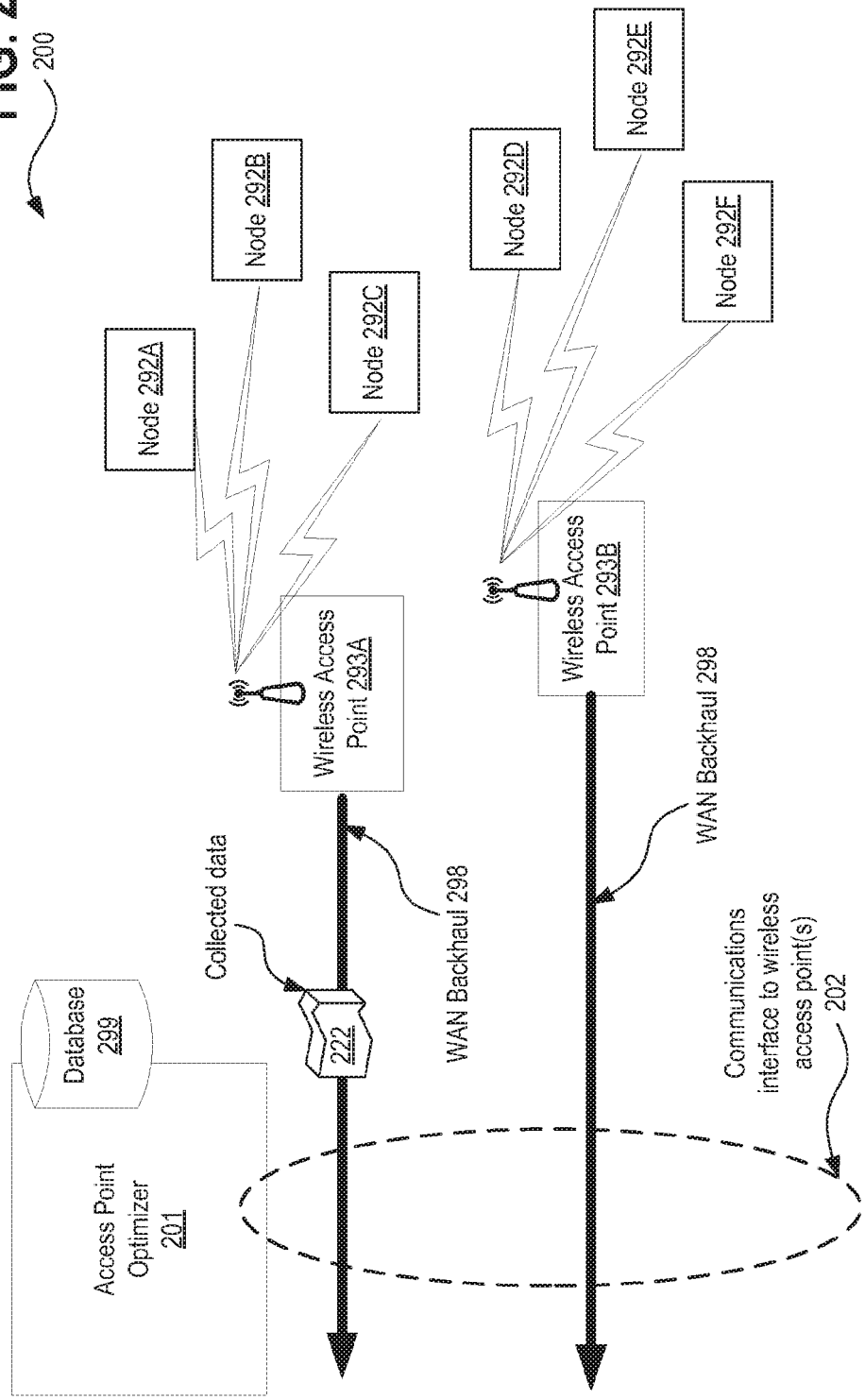

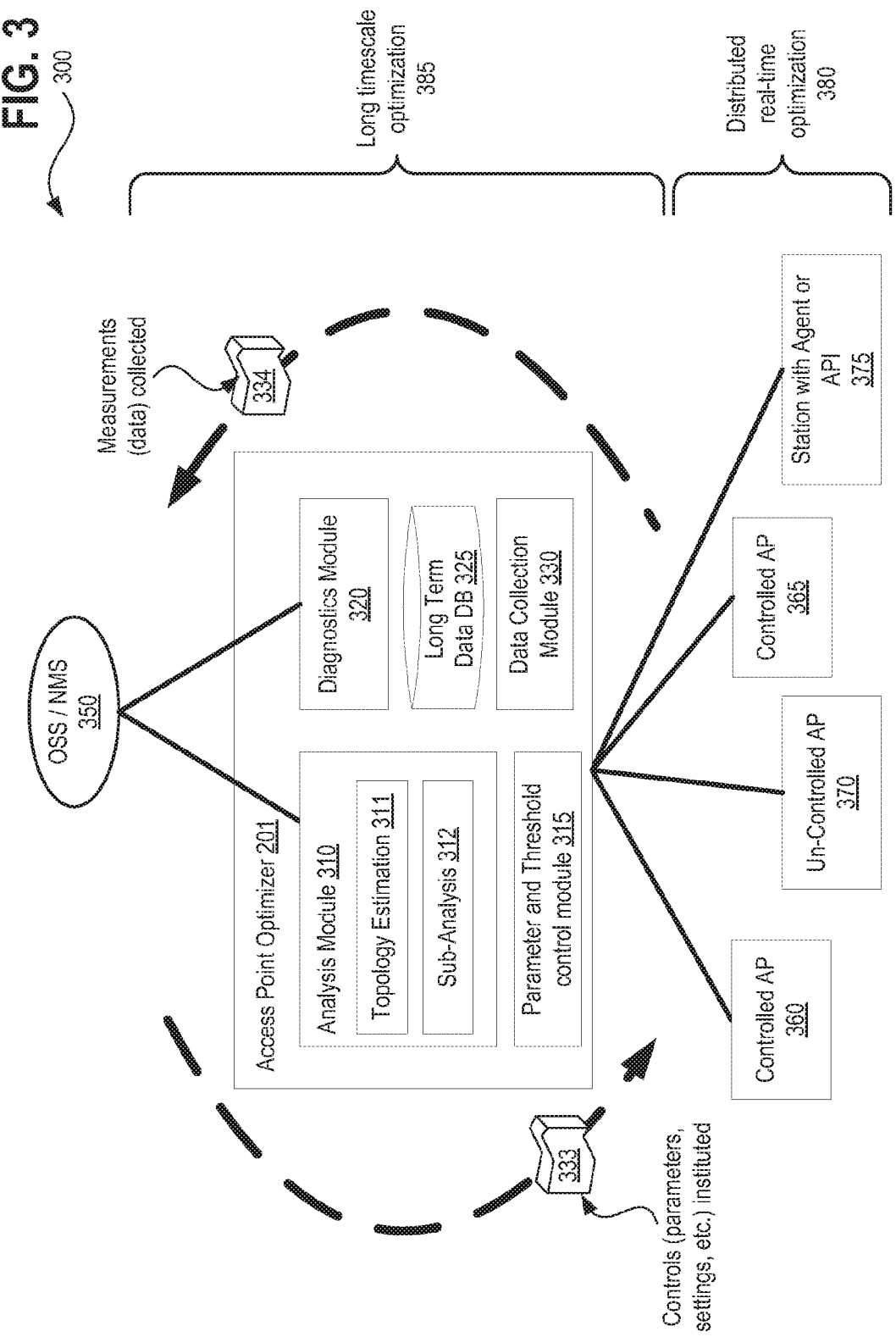

FIG. 4A
~401

Access Point 422

| Profile | Channel, etc. |
|---|---|
| STA1 traffic | Off |
| STA2 traffic | High |

Performance: Bad

Access Point 421

| Profile | Channel, etc. |
|---|---|
| STA1 traffic | Off |
| STA2 traffic | High |
| STA3 traffic | High |

Performance: Good

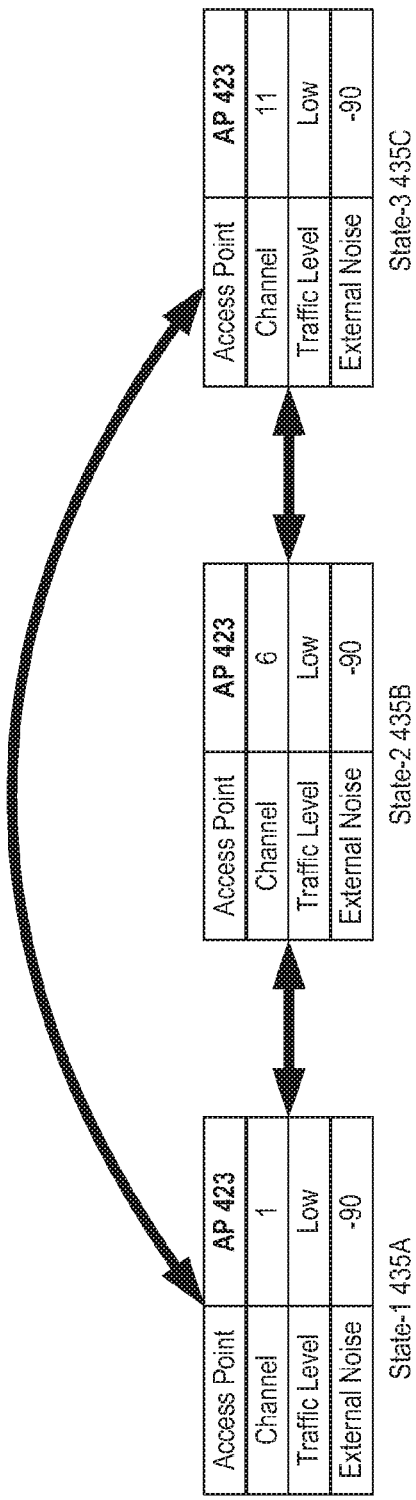

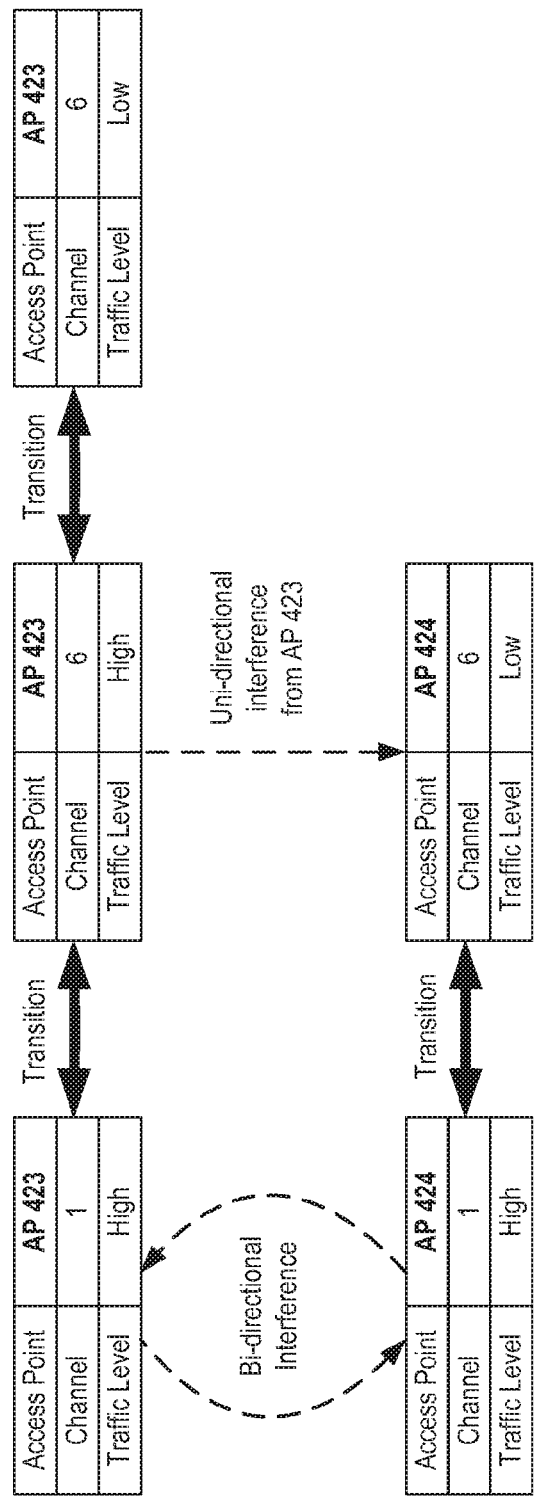

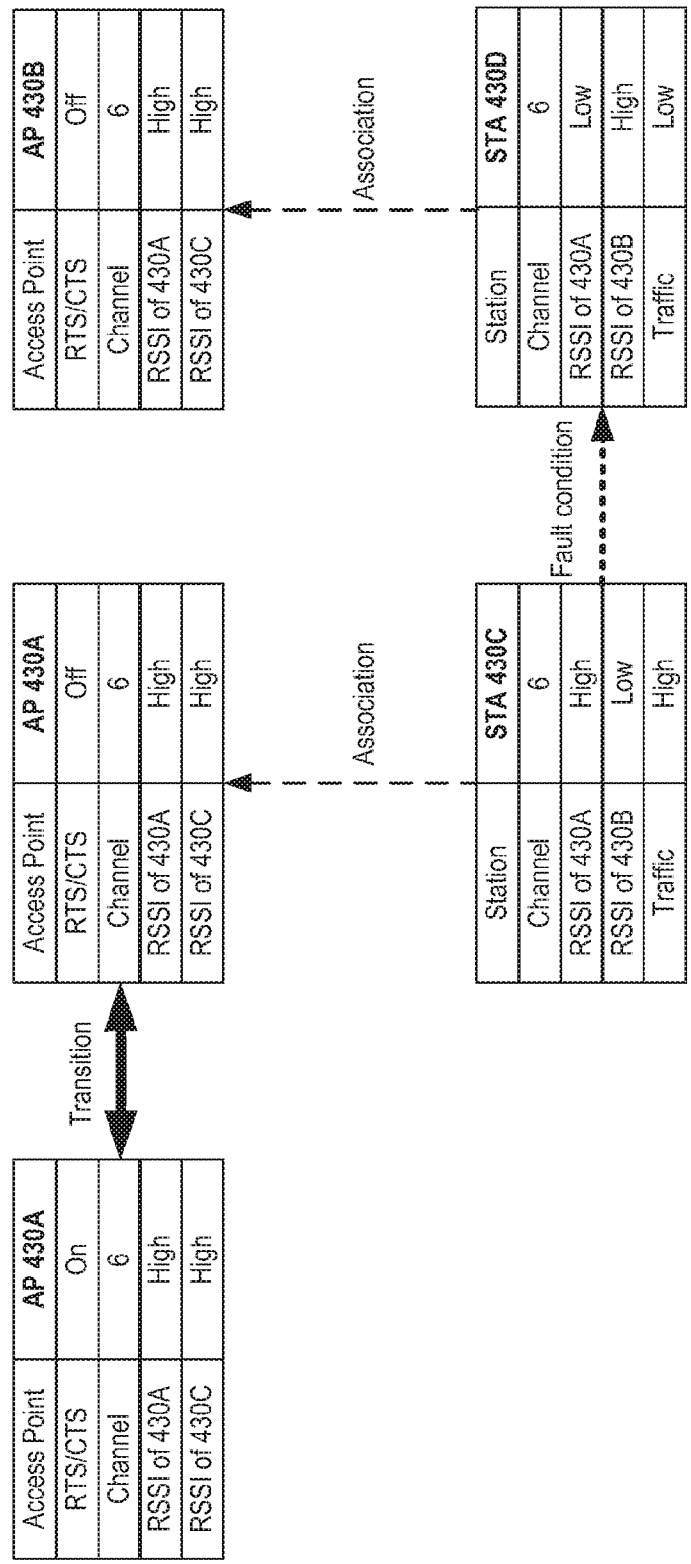

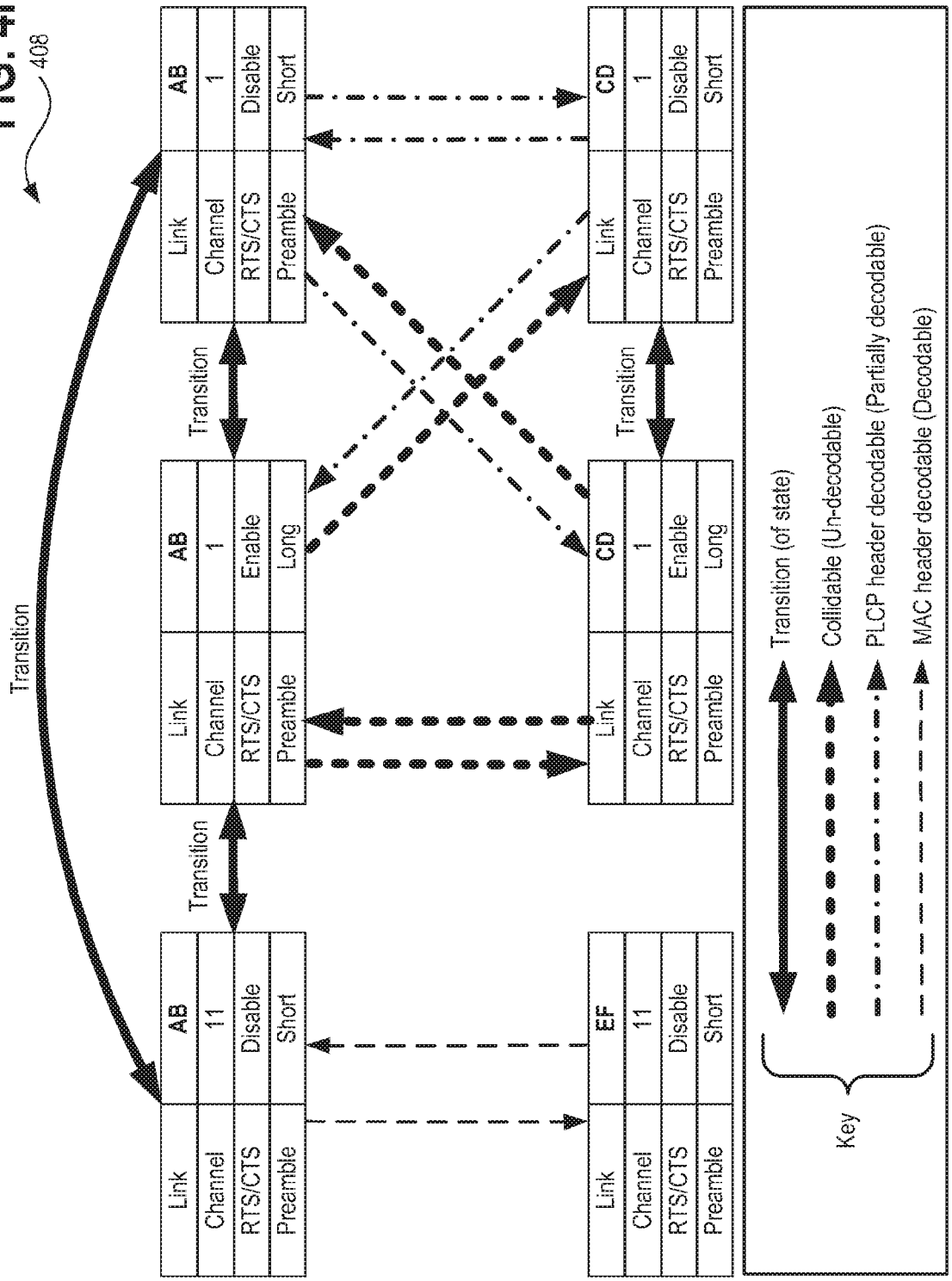

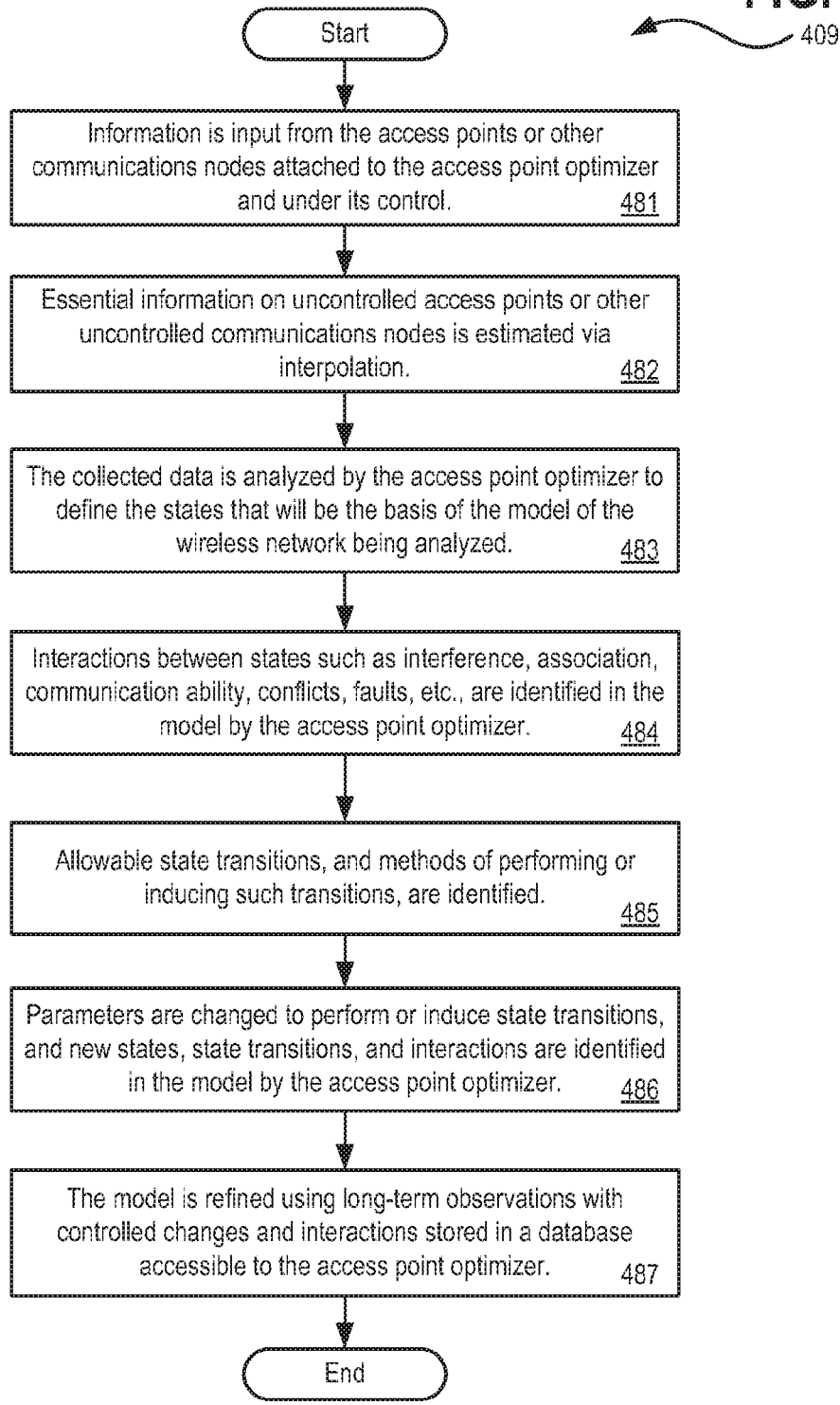

METHOD AND APPARATUS FOR IMPLEMENTING WIRELESS SYSTEM DISCOVERY AND CONTROL USING A STATE-SPACE

CROSS-REFERENCE TO RELATED APPLICATIONS

This application is a continuation of previously filed and copending patent application Ser. No. 14/779,942, entitled, "METHOD AND APPARATUS FOR IMPLEMENTING WIRELESS SYSTEM DISCOVERY AND CONTROL USING A STATE-SPACE," naming as inventors Kenneth J. Kerpez, Wonjong Rhee, Mung Chiang, and Ardavan Maleki Tehrani, and filed Sep. 24, 2015, which is a 371 National Phase of International PCT Patent Application No. PCT/US2013/033682, entitled "METHOD AND APPARATUS FOR IMPLEMENTING WIRELESS SYSTEM DISCOVERY AND CONTROL USING A STATE-SPACE," naming as inventors Kenneth J. Kerpez, Wonjong Rhee, Mung Chiang, and Ardavan Maleki Tehrani, and filed Mar. 25, 2013, which applications are hereby incorporated herein by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to apparatuses, systems and methods for implementing wireless system discovery and control using a state-space.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

In computer networking, a wireless access point (WAP) is a device that allows wireless devices to connect to a wired network using Wi-Fi, Bluetooth, cellular based technologies such as 3G, 4G, LTE, or connect via any other wireless standard for which it is configured. The wireless access point may additionally connect with a back-haul connection, connect with other wireless access points, connect with a router, and/or operate as a router itself.

Where multiple access points operate within particular geographic area, there may be interactions between such access points and there is likely also to be interference between the access points. Further still, the operating environment may negatively affect the performance of certain access points while improving or having no performance related affect on other access points, and a change in operational characteristics for a first access point may negatively or positively affect performance of another access point, even where the two access points do not directly communicate with one another.

In the conventional arts there is no solution available which satisfactorily accounts for how such multiple access points affect one another nor is there any conventional solution which satisfactorily controls multiple access points so as to provide improved overall performance for multiple access points that are within communication and interference range of one another.

The present state of the art may therefore benefit from apparatuses, systems and methods for implementing wireless system discovery and control using a state-space as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 2 illustrates an exemplary architecture in accordance with which embodiments may operate;

FIG. 3 illustrates an exemplary architecture in accordance with which embodiments may operate;

FIG. 4A illustrates an exemplary model in accordance with which embodiments may operate;

FIG. 4B illustrates an exemplary state transition graph in accordance with which embodiments may operate;

FIG. 4C illustrates an exemplary model which expands the depicted states to include multiple interacting access points in accordance with which embodiments may operate;

FIG. 4E illustrates an exemplary model depicting three adjacency matrices in accordance with which embodiments may operate;

FIG. 4H illustrates an exemplary model which gives a more complicated example of the same Link.State in accordance with which embodiments may operate;

FIG. 4I illustrates an exemplary process flow for data collection, discovery, and model creation in accordance with which embodiments may operate;

DETAILED DESCRIPTION

Figure 1A:
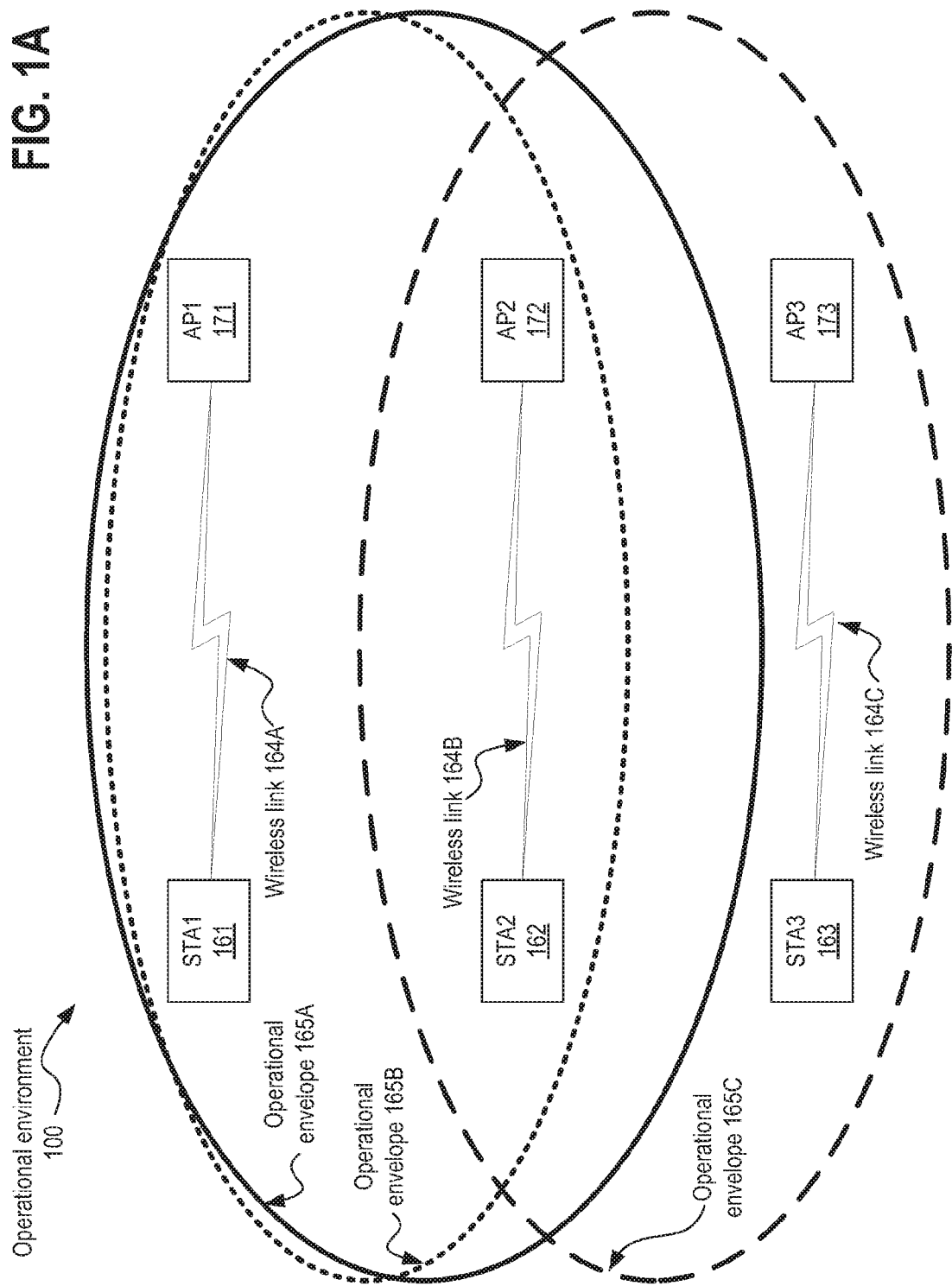
FIG. 1A illustrates an exemplary architecture in accordance with which embodiments may operate.

Described herein are apparatuses, systems, and methods for implementing wireless system discovery and control using a state-space.

In accordance with one embodiment, such means may include: establishing, a communications interface between an access point optimizer and a wireless access point; identifying one or more interfering wireless nodes exhibiting electromagnetic interference upon the wireless access point; collecting data from the wireless access point; determining a model of the wireless access point and the one or more interfering wireless nodes by: (i) modeling communicative relationships and properties among the wireless access points and the one or more interfering wireless nodes exhibiting electromagnetic interference upon the wireless access point based at least in part on the data collected, and (ii) modeling an active state of the wireless access points representing a current configuration of the wireless access points having therein one or more configurable parameters for the wireless access points based at least in part on the data collected; and quantifying a change in performance of the wireless access points or the one or more interfering wireless nodes based on a state change affecting the model.

For instance, quantifying a change in performance of the wireless access point or the one or more interfering wireless nodes based on a state change affecting the model may include, by way of example: (i) a change in configuration of the wireless access point or the one or more interfering wireless nodes; (ii) a change in traffic levels of the wireless access point or the one or more interfering wireless nodes; or (iii) a change in one or more performance metrics measured by the wireless access point or the one or more interfering wireless nodes.

One mechanism by which improvements can be realized for multiple access points operating within range of one another is to interface to one of the access points and then perturb one or more quantities affecting operational characteristics of that access point, and then monitor the operational environment as well as performance metrics reported by the various access points to see what changes occur. By modifying quantities of an access point such as control parameters and diagnostic parameters, it is possible to then observe what changes occur in the state space, if any, to either the access point that is directly modified or the other access points operating within range of the modified access point. If a change is realized at another access point within range based on modifications made to the first access point then such a relationship can be recorded in a model. By repeating this process multiple times, a more detailed and sophisticated model can be built that effectively shows that by changing parameter "x" on a first node, then result "y" is expected to occur at a second node. With more and more relationships built into the model, more extensive cause and effect type relationships can be understood for the particular operating environment within which the access points operate.

A state-space is a mathematical representation of a physical system as a set of states with relations between them. A state consists of a physical or abstract object and usually contains a number of state variables. Different states can be defined by different values of state variables.

In mathematics and computer science, graph theory is the study of graphs, which are mathematical structures used to model relations between states or objects. A graph is a collection of nodes (the states), and a collection of edges or links in the graph that connect pairs of states. Using graphs to implement the state space it is then possible to build matrices representative of all the known interactions, relationships, cause and effect changes, and so forth, within the state space. An example of such a matrix is a transition matrix. Given a vector indicating state occupancy at one epoch, this vector may be multiplied by the transition matrix to determine possible state occupancy at the next epoch. Another example of such a matrix is an adjacency matrix, which represents which states of a graph are adjacent to or otherwise interact with which other states. The entries in the adjacency matrix can indicate properties of the interactions between states.

Further application of graph theory then permits for the combining or processing of multiple such matrices and collections of information, from which it is then possible to predict within a virtual state space, how configuration changes to the model will or should be realized in the physical world for the access points evaluated.

For instance, the model can be created or manipulated through simulation in a virtual state space so as to experiment and discover what settings are predicted to be optimal without having to actually implement and measure each possible permutation of settings on the physical devices. The opposite is also true. For instance, a configuration found to be idealistic on the physical devices can be imported into the virtual state space and further improve the model.

Additionally, through the use of a cloud based computing system to perform the optimization means described herein, it is possible to leverage the processing power of a remote machine without having to re-deploy specialized hardware into the field or require simplistic wireless access points to incorporate expensive computing hardware.

With large-scale WiFi network deployments at businesses, public spaces, municipal networks, etc., management has conventionally focused on baseline configuration and placement through a process sometimes known as provisioning. The provisioning process is labor intensive and primarily seeks to improve only the most obvious performance characteristics such as geographic coverage for the site in question and the ability to handle anticipated traffic load. Areas are assessed for Received Signal Strength Indicator (RSSI) and deployment of a new access point is considered when RSSI measurements fall below a desired threshold. Once in operation, if a particular access point is frequently overwhelmed by near-by user activities and is found to be operating at its maximum traffic load, then again, deployment of a new access point is considered.

Once deployed, however, settings for the various access points usually remain static, until such time that a problem arises and new RSSI measurements are taken or an access point is reviewed for traffic load.

The most advanced access points presently available are capable of self adjusting certain configurations such as channel assignment, but these self adjustments are performed wholly in isolation within a given access point and make no assessment or consideration of other access points that are operating nearby, much less, how localized configuration changes may negatively or positively affect performance of other nearby access points. No overall joint model is provided for multiple access points and self adjustments are limited to very simplistic changes, such as modifying a channel assignment.

With residential WiFi access points, options for performance management are essentially non-existent, beyond a user guessing at improved physical placement options and attempting to blindly change settings without any feedback or diagnostics provided. Unsurprisingly, residential consumers are often frustrated and many simply accept less than optimal performance.

As the wireless arts continue to advance, WiFi connections for video service using 802.11n or 802.11ac enabled set-top boxes are beginning to be deployed by both telcos and cable companies.

On the positive side, such wireless deployments do not require drilling holes or hooking wires. But detrimentally, such deployments work only in sparsely populated areas where there is very little interference. When deployed in more densely populated areas, such as within an apartment building, the devices function poorly resulting in many complaints and connectivity is often insufficient to maintain the bandwidth necessary to communicate moving video wirelessly, especially high definition video.

The described means for implementing wireless system discovery and control using a state-space may prove extremely useful to both commercial deployments as well as residential deployments, especially for those in congested areas, as the described means are capable of optimizing the operational characteristics for multiple such access points collectively.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within an apparatus to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1A illustrates an exemplary architecture 100 in accordance with which embodiments may operate.

In particular, there is depicted an operational environment 100 within which several access points AP1 171, AP2 172, and AP3 173 operate, as well as mobile stations STA1 161, STA2 162, and STA3 163. As shown, STA1 161 is communicatively interfaced via a wireless link 164A with AP1 171; STA2 162 is communicatively interfaced via a wireless link 164B with AP2 172; and STA3 163 is communicatively interfaced via a wireless link 164C with AP3 173.

More interestingly, however, is that multiple access points are present, and each establishes an operational envelope (165A, 165B, and 165C) within the wireless environment which provides both wireless coverage to those mobile devices or stations that are within range, but also results in potentially detrimental interference to other access points.

For instance, AP1 171 results in wireless coverage via operational envelope 165A sufficient to support STA1 161 which is shown as connected via wireless link 164A but may result in unwanted interference to AP2 172 and STA 162. AP2 172 provides wireless coverage via operational envelope 165B sufficient to support both STA1 161 and also STA2 162, but does not result, according to this exemplary depiction, in detrimental interference to AP3 173, yet is nevertheless subjected to interference from AP3 173 as well as AP1 171. AP3 173 on the other hand receives no interference from AP1 171 yet is subjected to interference from AP2 172. AP3 173 is communicatively interfaced with STA3 163 which resides within the operational envelope 165C wireless range of AP3 173.

Figure 1B:
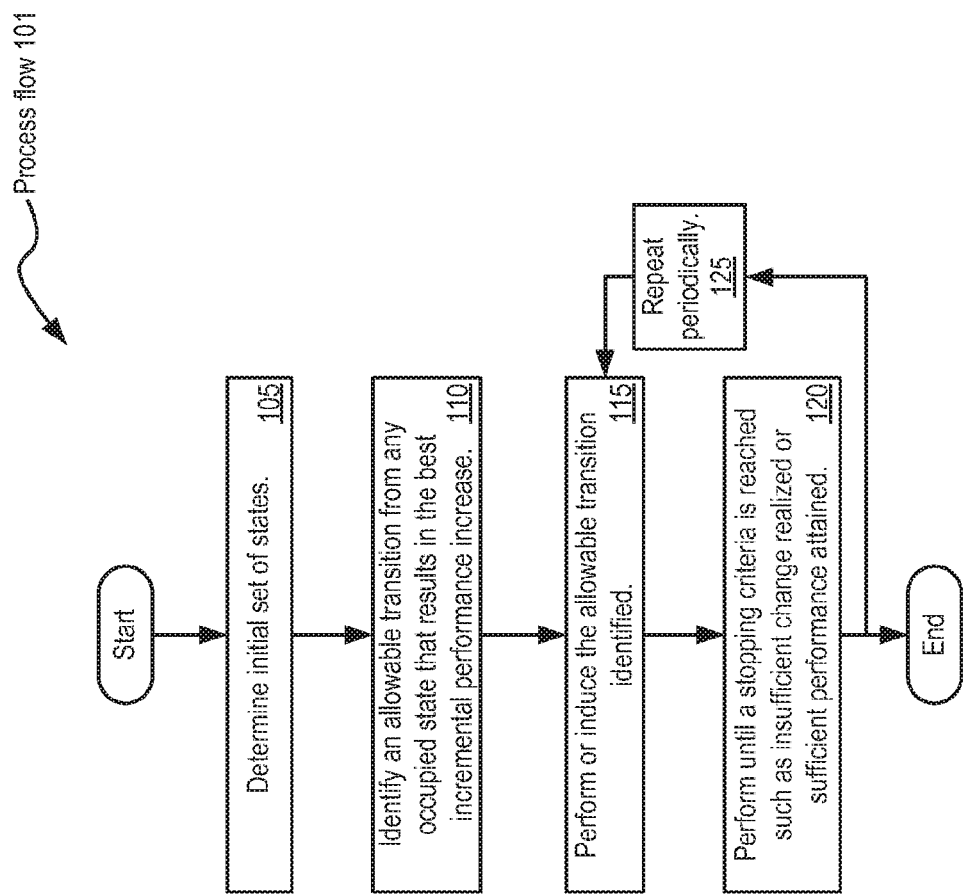
FIG. 1B illustrates an exemplary process flow diagram in accordance with which embodiments may operate.

FIG. 1B illustrates an exemplary process flow diagram 101 in accordance with which embodiments may operate. In particular, means are presented for implementing wireless system discovery and control using a state-space as described herein, beginning with processing logic at block 105 to determine an initial set of states. At block 110, processing logic identifies an allowable transition from any occupied state that results in the best incremental performance increase. At block 115, processing logic performs or induces the allowable transition identified at block 110. At block 120, processing logic performs the operations until a stopping criteria is reached, such as an insufficient change being realized or a sufficient performance being attained. The process flow 101 then ends, or repeats periodically through block 125, as necessary by returning to block 115 where an allowable transition, the same or different from before, is again performed.

While it is not typically feasible to eliminate the all interfering traffic on access points (APs) 171, 172, 173, it is possible to implement the means described to optimize operation of the access points and mitigate the negative effects of such interference.

For instance, the described means enables modeling of such interference between multiple interacting APs 171, 172, 173 and how such interference may be affected by wireless parameter settings at the various access points. The model can then be utilized to identify faults and to improve performance.

In one embodiment, such a model consists of states, with different local settings such as channels, transmit power, RTS/CTS setting, frame burst setting, traffic conditions, interference conditions, and performances at each state. Once the access points and other components within a wireless environment are modeled and identified as a state space, the state space can be optimized using algorithms such as by solving for optimal points, or through iterative optimization.

These optimization procedures can determine the best configurations to use with the particular state space including the specific parameters and settings to be applied at each of the access points or at a sub-set of the access points which are directly controllable.

In certain embodiments, many such access points may be under the control of a single implementation of an access point optimizer. In other embodiments, one or more access points are controlled by an access point optimizer while other interfering access points are observed and modeled but cannot be controlled by the access point optimizer. In such embodiments, configuration settings at a controlled access point may be targeted toward improving or mitigating interference from an uncontrolled and interfering access point.

Figure 1C:
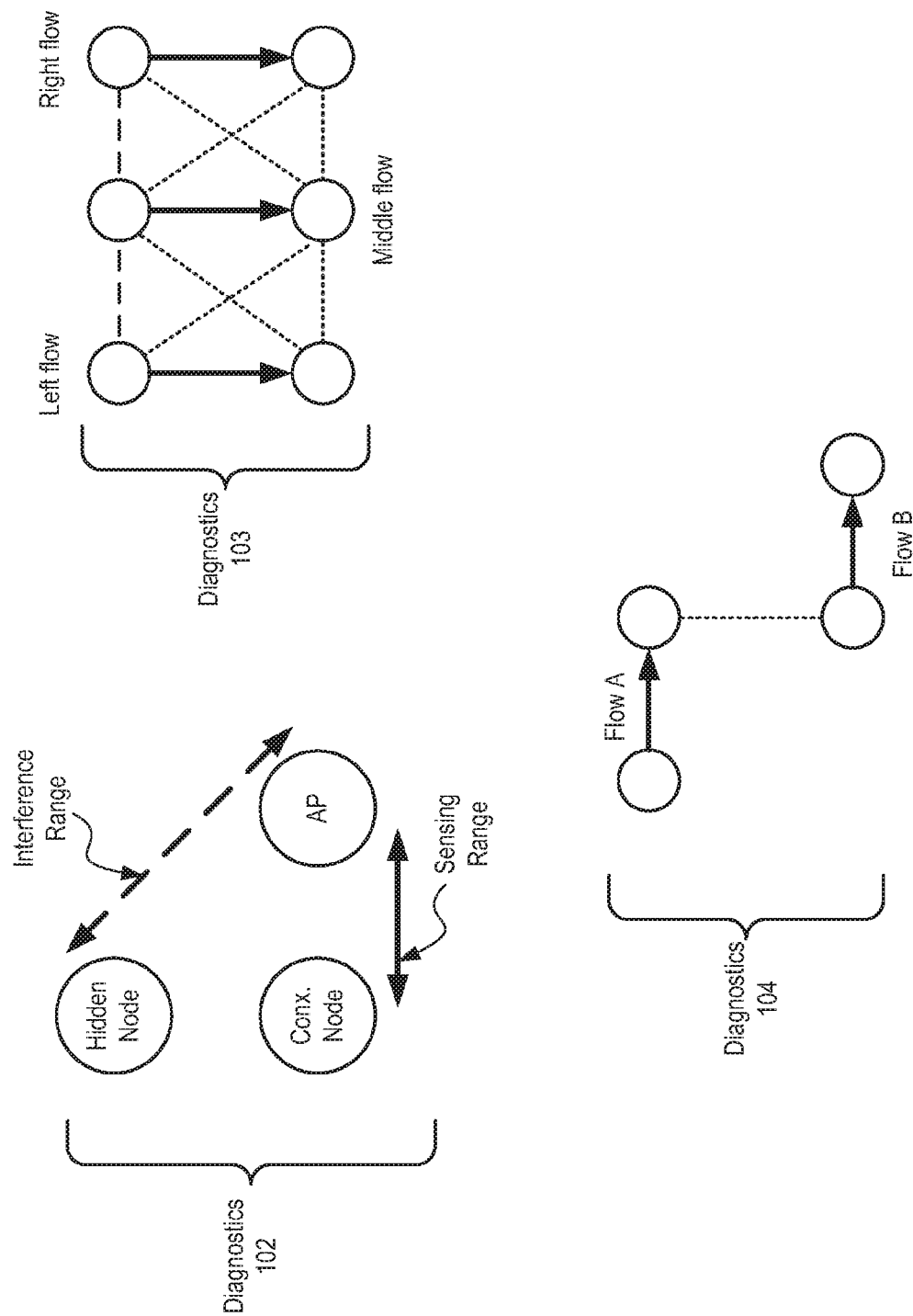
FIG. 1C illustrates exemplary diagnostics in accordance with which embodiments may operate.

FIG. 1C illustrates exemplary diagnostics 102, 103, and 104, in accordance with which embodiments may operate.

Once modeled, the state-space can be directly examined to find mis-configurations, interference, and conflicts; which is useful for diagnosing problems, determining remediation actions, and assigning resources. From the discovered state-space, it is possible to reverse engineer the likelihood of the following main types of topologies that induce poor performance for at least one flow.

Diagnostic 102 depicts a hidden node which is a standard problem in wireless networks where sensing range is shorter than interference range.

Diagnostic 103 depicts a flow in the middle problem in which the middle flow is often starved due to backing off with respect to both the left and the right flows.

Diagnostic 104 depicts an information asymmetry problem in which flow B is often unfairly penalized as its transmitter backs off due to proximity to the receiver of flow A.

Such problems can be diagnosed within the model once established and prevented from occurring at physical access points based on the model's predictions.

Examination of the state-space can also help estimate the number of un-controlled APs, the number of stations, typical traffic volume, WiFi interferers, the existence and magnitude of non-WiFi interferers, etc.

Some discovered faults and mis-configurations will have a natural remediation, for example if a link is identified to be wasting bandwidth by transmitting too many packets in isolation then frame aggregation can be enabled on that link. Similarly, some channel re-assignments can be seen to directly improve overall performance.

Resource assignment may include WiFi channel and bandwidth assignment and controlling the association of a given station with a given AP. Resource allocation can be influenced by performance, user-preference, subscriptions, traffic classes, fairness, etc.

Fairness can be controlled through the choice of utility functions for the stations. For example, proportional fairness can be obtained by using logarithmic utility functions. Furthermore, weights can be installed in front of each utility function. These weights can be derived from either billing differences (e.g., some users pay more for greater weighted preference), or from multiple QoS classes, including in-building users, users passing by, users of various degrees of quality assurance, and so forth. These weights can also reflect traffic levels for a given application flow, such as the number of parallel TCP sessions.

FIG. 2 illustrates an exemplary architecture 200 in accordance with which embodiments may operate.

In particular, there is an access point optimizer 201. The access point optimizer 201 could be remote or local to the wireless access points. In some embodiments the optimizer could be integrated in a wireless access point, and in other embodiments the optimizer could be remote from the wireless access points. Two access points are shown in this example with wireless access point 293A being connected with multiple wireless nodes 292A, 292B, and 292C. Wireless access point 293A is further connected with WAN backhaul 298 which provides access to the Internet or provides a communications interface to a service provider which establishes Internet access for the wireless access point 293A. By connecting to the Internet, wireless access point 293A may access remote server-based or cloud-based services, such as those provided via the depicted access point optimizer 201.

Access point optimizer 201 communicates with wireless access point 293A by establishing a communications interface to the wireless access point as depicted at element 202. For instance, access point optimizer 201 may communicate with the wireless access point 293A via the Internet through the WAN backhaul 298.

Wireless access point 293B is also depicted which supports wireless nodes 292D, 292E and 292F. Any or all of the wireless nodes 292D, 292E and 292F may interfere with communications by wireless access point 293A. Similarly, wireless access point 293B may interfere with communications by wireless access point 293A.

In one embodiment, access point optimizer 201 may establish a communications interface to each of wireless access points 293A and 293B as depicted by element 202 and may further control both wireless access points 293A and 293B. In other embodiments, one but not both of the wireless access points 293A and 293B are accessible to, and controllable by, the access point optimizer 201.

The access point optimizer 201 may operate as a remote server or cloud-based platform that is capable of performing computationally intensive operations on a large database 299, unlike simple auto-configuration functions built into some network equipment components. For instance, the access point optimizer 201 may perform modeling of the wireless access point 293A and its states, links, interfering sources, and other characteristics in the database 299 based on collected data 222 received from one or more wireless access points 293A, 293B. The model in the database 299 may then be exploited by the access point optimizer 201 to discover faults and mis-configurations.

The collected data 222 and the resulting model may extend over a long time period and may incorporate, model, and record the effects of time-varying faults and interference. The resulting information may then be utilized as input for manipulating control parameter settings to improve performance of the wireless access points 293A-B in the model and where sufficient improvements are identified, the control parameter settings may then be applied by the access point optimizer 201 to network components in the physical world, such as by re-configuring one or more of the wireless access points 293A-B.

FIG. 3 illustrates an exemplary architecture 300 in accordance with which embodiments may operate. An OSS/NMS (e.g., Operations Support System or Network Management System is depicted at element 350 which is communicatively interfaced to an access point optimizer 201.

The access point optimizer 201 includes an analysis module 310 having therein a topology estimation 311 component and a sub-analysis 312 component to perform further analysis. Further included with access point optimizer 201 according to the depicted embodiment are a parameter and threshold control module 315, a diagnostics module 320, a long term data database (DB) 325, and a data collection module 330.

The access point optimizer 201 provides optimization services for several remote network components, including controlled AP 360, un-controlled AP 370, controlled AP 365, and a station with an agent or AP1 (Application Programming Interface) 375 which is capable of communicatively interfacing with the access point optimizer 201.

The access point optimizer 201 collects measurements or data as depicted by element 334 and institutes controls such as parameters, settings, and so forth, as depicted by element 333. On the right-hand side, element 385 indicates that the access point optimizer 201 provides long-timescale optimization whereas element 380 indicates that the various network components 360-375 institute distributed real-time optimizations. Long timescale optimization could be done by a server remote from, or local to, the access points or in some embodiments could be done within the access points.

The access point optimizer 201 can vary parameter settings and state-space occupancy over three timescales according to described embodiments. For instance, the longest timescale is managed through the exploitation of a database 325 that includes data from many diverse locations and times.

Server-based remote data collection and control implements an outer loop on a long timescale corresponding to iteratively measuring data 334 and instituting controls 333 as depicted.

Distributed real-time optimization 380 implements local control on the shortest timescale in conjunction with the access point optimizer 201 which may push control thresholds to the access points (APs) 360 and 365. Those access points then adapt local transmission settings as real-time performance metrics or configuration parameters cross the thresholds provided by the access point optimizer 201.

All three timescales operate in a feedback loop, with successive measurements leading to successive control reactions.

Compared to optimization by individual devices, the access point optimizer 201 may utilize input data collected from many devices over a long timescale, regardless of whether such devices are nearby or not. For instance, some of the devices may be from the same geographic neighborhood where access points interfere and interact with one another while other data may be collected from wholly non-interacting devices. The access point optimizer 201 can further run global optimization for all the attached devices under its control within an entire neighborhood or geographic region. By analogy, the wireless devices are the "eyes" and "arms," and the access point optimizer 201 is the "brain" interpreting and making decisions based on sensory data received.

Inputting data from multiple AP's and/or stations provides a unique capability for the access point optimizer 201 to determine if a noise or interference source is affecting many of the AP's and/or stations in a neighborhood or shared geographic region. Interactions between different communications links, such as interference, can be identified and incorporated into a model, which may then be used to identify faults caused by these interactions.

The various access points, stations, links, interactions, interferences, configurations, and so forth are internally modeled by the access point optimizer 201 as a state space, with allowable state transitions corresponding to configuration or environment changes. The state-space can be locally perturbed by varying wireless configuration parameters. This is repeated throughout all elements of the network, multiple times, in an algorithmic manner to adapt the state-space toward globally-optimal solutions where the overall performance of all nodes and links is optimized. Optimization may be directed toward a statistic such as maximum, minimum, or average of bit rates, throughput, delays, coverage, etc. Optimization may also account for differing subscription levels or fairness criteria.

In accordance with certain embodiments, neighborhood information from broadband management systems or other related Operations Support Systems (OSS) or Network Management Systems (NMS) may further be input into the access point optimizer 201 for use with improving the model and further enhancing predictive capabilities.

In certain embodiments, traffic patterns are identified at each access point as well as interference between access points. The storage and computational power of the access point optimizer 201 can subsequently be leveraged to determine optimal channel and access point associations to avoid interference, both in time and frequency.

Capabilities of an end user's device and applications at such a device may be further leveraged through probing and measurement functions. For instance, by exploiting APIs, functionality, or applications executing at an end user's device such as station 375 depicted. Some end user devices operating as stations can provide additional information to the database 325 for use by the access point optimizer 201. Such functionality can be enabled by mobile applications executing on smartphones, software installed on laptops, agents installed in firmware devices, by a browser, etc. Not only can such data fill in gaps between the data from the access points, but such data can also include extensive higher-layer statistics or data pertinent to a particular application, such as streaming video.

State transition changes allowed by the state transition graph can be induced by the access point optimizer 201 via configuration changes sent to the access points. Such transition changes may be directly performed if the configuration is part of the state definition, or indirectly induced by a configuration change that then changes a state variable such as a channel change eliminating interference.

State-space optimization can be performed with a static optimization, for example by determining the stable points or equilibria of the state-transition matrix, then determining which of these stable points represents an optimal or desirable equilibria. While this may be achieved with a relatively small, well-known, network, an iterative optimization is sometimes easier to realize.

The state space can also be optimized in-situ via iterative optimization. Such a technique may prove useful when optimizing a large network and is readily implementable using the described techniques. For instance, the state-space graph can be iteratively optimized using classic dynamical systems techniques, such as by performing state transitions that are toward the steepest descent or that are the next greediest action. This is repeated, with multiple state transitions gradually trending toward a point of overall optimality.

The wireless system undergoing evaluation by the access point optimizer is modeled with multiple states, where each state is defined by certain ranges of values of particular parameters (or state-variables) for particular wireless nodes or links A state could further be defined by certain performance levels, configuration settings, traffic levels, time-of-day, etc.

FIG. 4A illustrates an exemplary model 401 in accordance with which embodiments may operate. In particular, there are two access points depicted. Access point 421 has "good" performance, whereas access point 422 has "bad" performance. Within each of the access points are modeled various parameters. At access point 421: STA1 traffic is "off," STA2 traffic is "High," and STA3 traffic is also "High." Indicated at access point 422: STA1 traffic is "off," and STA2 traffic is "High."

The model 401 defines different potential states, traffic levels, parameters, etc., with the definition being loose at this phase due to a lack of interaction between the access points 421 and 422 by which to establish more sophisticated metrics. This basic model 401 results in zero entries for associated state transition and adjacency matrices because there are no identified interactions between the two access points, however, the model 401 does establish base characteristics of each access point 421 and 422.

Model 401 records a state-space where state is defined for each communication node such as a WiFi access points or access points 421 and 422. Each state contains the AP's profile setting (channel, RTS/CTS setting, transmit power, frame burst setting, etc.) that is commonly applied to all stations and the traffic level of each discovered station. RTS/CTS stands for "Request to Send/Clear to Send." The traffic level can be, for instance, off, low, medium or high. In this case performance is not part of state. Rather, there is a set of states and corresponding set of performance measures for the states. The set of performance measures can be used to formulate an overall objective function or an overall cost function.

The state-space can further include interactions between communications nodes and communications links, such as per-link traffic volume, per-link performance, conflicts, interference, and other faults. The state-space is modeled by a graph or graphs showing allowable state transitions, interference between states, conflicts between states, faults, associations, etc. Different states can have different conflicts with other states, with different performance levels.

FIG. 4B illustrates an exemplary state transition graph 402 and more specifically a single access point with a channel transition in which one state transition matrix defines allowable state transitions. The state transition graph 402 shows a state-space where state is defined as the configuration of a communication node and in which each communication node may have multiple states. Each state may be defined by a different configuration for that communication node.

As can be seen, there are three states depicted, state-1 at 435A, state-2 at 435B, and state-3 at 435 C. All states correspond to the same access point, which is AP 423, and all state variables are identical in each state except for the "channel" which is at value 1 for state-1, at value 6 for state-2 and at value 11 for state 3. The arrows depict that the access point (AP) 423 is allowed to transition between any of the states and in any order. For instance, state transitions are allowed to and from states 1 and 2, to and from states 2 and 3, and to and from states 1 and 3. This is fully connected and the corresponding state transition matrix is a three by three matrix with all entries allowing state transitions.

FIG. 4B depicts such state transitions very simplistically. Faults, associations, performance, etc., The following types of state variables are generally available. First: (1) design/control variables and degrees of freedom, such as channel selection. Second: (2) exogenous variables decided by factors outside an operator's control but that can be affected potentially by the users. Examples include location and mobility. Third: (3) user traffic levels that directly decide the interference load that is created to neighbors, etc. And fourth: (4) performance metrics such as throughput and error rates which can be considered as a part of state. Each of these variables may be considered as the dependent result of the states instead of explicitly being a state-variable.

Discovering the underlying state-space may be considered more useful than just discovering an uncategorized set of interactions. Discovery here is a long-term iterative process, where the error in the state-space estimate decreases with successive measurements. The state-space representation allows the access point optimizer to both directly identify interference or other conflicts in the system and to also identify methods of transitioning the state-space occupancy to alleviate such problems.

Changing one state variable, for example, by changing the channel on one access point, may in turn cause multiple state transitions. For instance, another access point may change its own state due to the change in interference. A state-space representation indicating allowable transitions provides the means to vary the set of wireless configurations to affect transitions that can be directed toward system optimization. Transitions among design/control state variables represent control algorithms, transitions among exogenous state variables capture environment changes, transitions among user traffic level state variables indicate user activity changes, and transitions among performance metric state variables represent performance fluctuations.

Modeling the wireless system and its environment generally includes the access point optimizer modeling states as physical communication devices or communication links between devices, in which the associated configuration, interference, and performance may additionally be included as part of a state. Connections between states, or links in the state-space, generally show allowable transitions between states, interference between differing states, conflicts between states, associations between states, etc. The state-transition matrix or adjacency matrix contains the information identifying the graph links between states.

One or more of the following methods may be used to describe the wireless network as a state-space. A communication node may be a WiFi Access Point (AP). State may be defined by the communication node, communication link(s), the communication node's parameter settings, traffic levels of the node or attached stations, traffic level of each discovered station, performance levels, etc. However, there may not be a one-to-one correspondence between state and any one of these variables, and state occupancy may be affected by the state of other access points.

A profile is a particular configuration or set of parameters; such as: {the radio channel, frequency band, RTS/CTS setting, frame burst setting, transmit power}. Profiles are a convenient way to select a set of overall configurations that may apply in different environments. States may also be defined by profiles.

Well-known terms from graph theory are used in the following exemplary models, such as nodes, links, and state transition matrix and adjacency matrix. These can be explained by any good textbook on graph theory. The state-space is represented by a directed graph, wherein a "communication node" may or may not be a "node in the state space", and a "communication link" may or may not be a "link in the state space."

FIG. 4C illustrates an exemplary model 403 which expands the depicted states to include multiple interacting access points. In particular, access points 423 and 424 are depicted. Additionally depicted is the impact of state transitions. As shown here, two types of connections between states are depicted. The horizontal solid arrows represent state transitions for the respective access points 423 and 424. The hashed arrows traversing the graph vertically depict interference amongst the access points. On the left, both access points 423 and 424 have "high" traffic levels and each exhibits interference to the other resulting in bi-directional interference. In the middle, access point 423 has a "high" traffic level and exhibits uni-directional interference onto access point 424 which has a "low" traffic level. According to this exemplary model, there appears to be no significant interference from an access point with a low traffic level, as is indicated by access point 423 having a "low" traffic level as set forth on the right hand side.

Rather than simply indicating the presence of interference, interference levels could also be assigned a variable indicating the level or extent of interference. In this formulation, determining interference is indirect; and requires some external knowledge of the interactions between links. There are now two matrices: the state-transition matrix, and the adjacency matrix for interference.

Figure 4D:
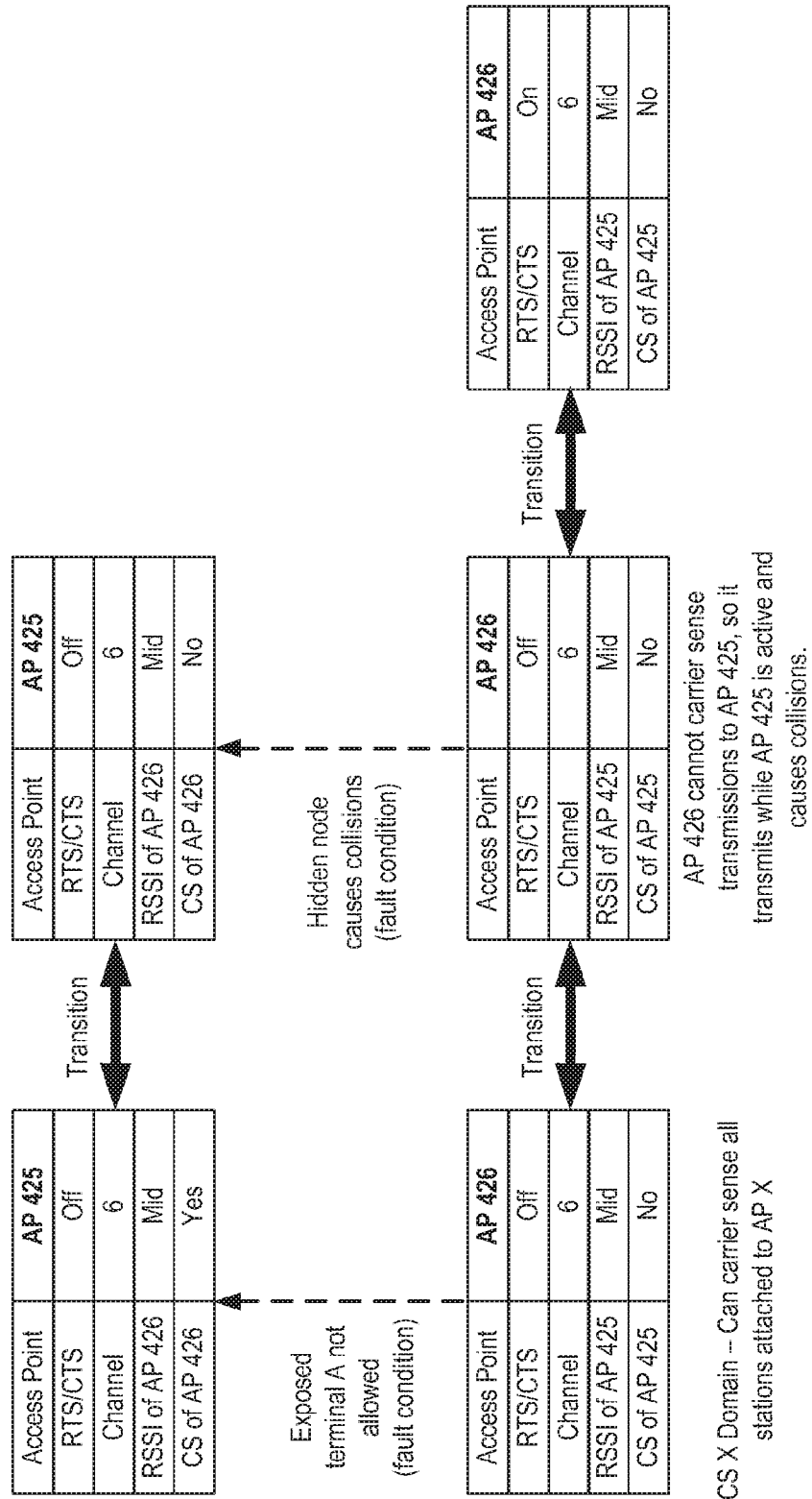
FIG. 4D illustrates an exemplary model which adds an explicit state variable determining the carrier sense range of other access points in accordance with which embodiments may operate.

FIG. 4D illustrates an exemplary model 404 which adds an explicit state variable determining the carrier sense range of other access points. As shown here, two types of connections between states are depicted. The horizontal solid arrows represent state transitions for the respective access points (APs) 425 and 426. The hashed arrows traversing the graph vertically depict fault conditions. Now the state space can be seen to determine fault conditions. However, the links or stations causing the faults are not directly identified.

FIG. 4E illustrates an exemplary model 405 depicting adjacency matrices including the state transition matrix, and adjacency matrices for faults and associations. Here the states are expanded to include multiple interacting access points 430A and 430B as well as their associated stations 430C and 430D. The horizontal solid arrow between the two states of access point 430A represents a state transition for the access point 430A. The vertical hashed arrow traversing the graph denotes associations between wireless stations. Specifically, access point (AP) 430A is associated with station 430C according to the graph and access point 430B is associated with station 430D according to the graph. The dashed or dotted horizontal line between station 430C and 430D indicates a fault condition, such as interference, etc.

Figure 4F:
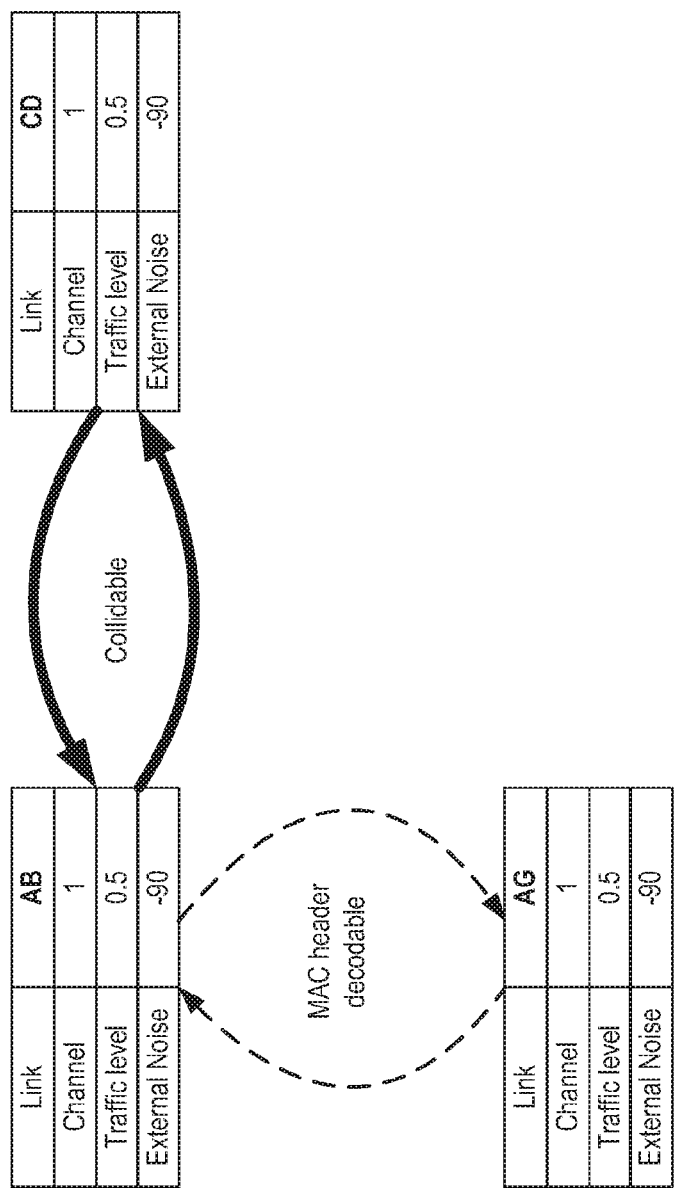
FIG. 4F illustrates an exemplary model which defines a state to be a communication link in accordance with which embodiments may operate.

FIG. 4F illustrates an exemplary model 406 which defines a state to be a communication link. Here, the solid black connections in the horizontal direction and the hashed black lines in the vertical direction indicate different interference levels between states. For instance, the vertical hashed lines indicate an ability to receive and decode MAC (Media Access Control) headers whereas the solid black lines on in the horizontal direction indicate undecodable interference that causes collisions. This shows a direct relation between the state-space and faults or conflicts. Many communications systems, such as WiFi, are bi-directional systems and thus, the connections indicating interference may only need to include the worst-case on either end of each communication link. This formulation lacks state transitions and so does not show how states may be altered to eliminate interference.

The "Link.State" formulation of a state-space as set forth here permits each communication link to define multiple states in which each state includes configuration parameters which can be changed to effect state transitions. Two matrices are thus defined: the state transition matrix and an adjacency matrix for decodability/conflicts. This formulation directly identifies the relationship between conflicts and configurations, and allows the state space to be optimized by traversing state transitions.

Figure 4G:
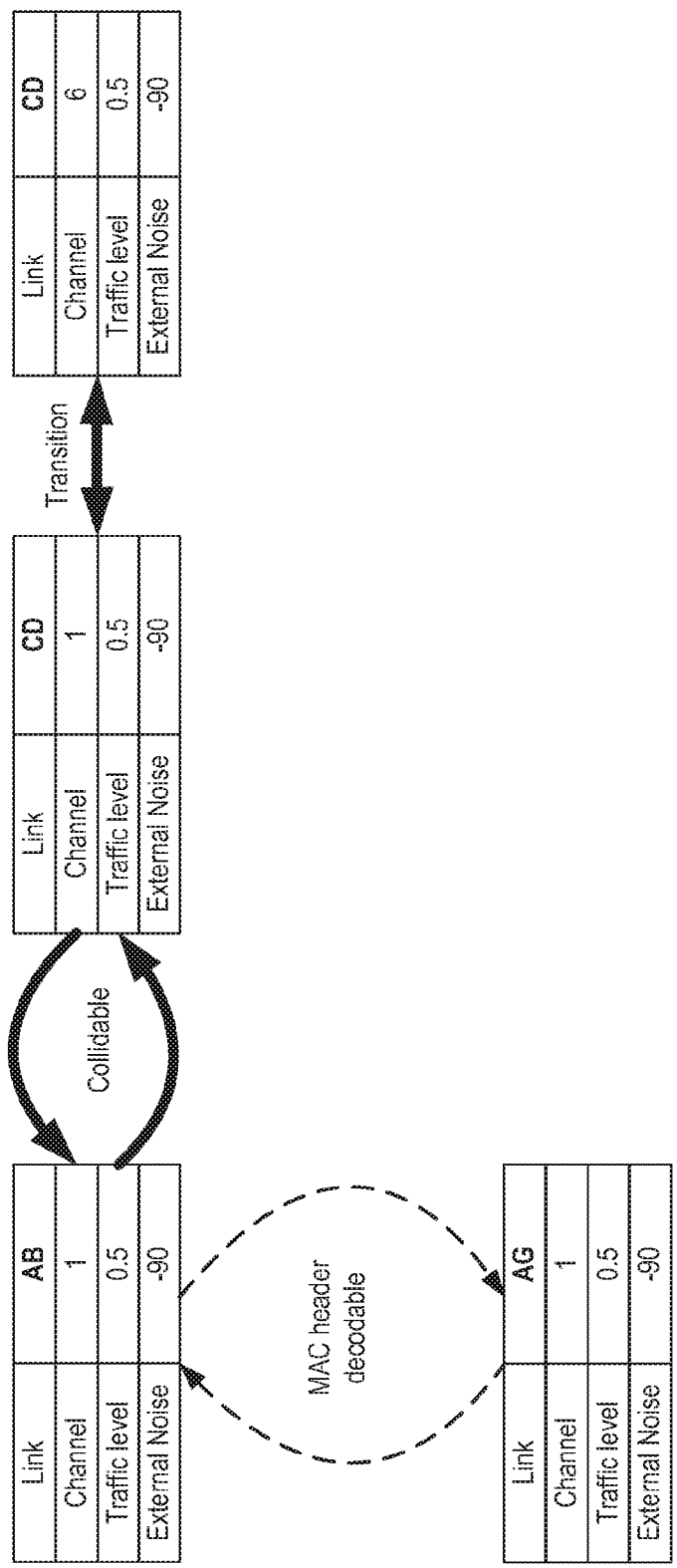
FIG. 4G illustrates an exemplary model which defines a state to be a communication link and additionally depicts an allowable transition in accordance with which embodiments may operate.

FIG. 4G illustrates an exemplary model 407 which uses the Link.State formulation to define a state to be a communication link and additionally depicts an allowable transition. Here, the graph is largely identical to that of FIG. 4F, except that on the right a state transition is indicated for link "CD" which transitions from channel "1" to channel "6" according to the graph, and is depicted as no longer interfering with the other links after the transition.

FIG. 4H illustrates an exemplary model 408 which gives a more complicated example of the same Link.State formulation as set forth in FIG. 4G. This model 408 assumes that RTS/CTS in the PLCP header is decodable in the middle two states, so that collisions are avoided. Each of the conflicts, or lack thereof, between states are labeled accordingly including fully decodable where the MAC header is decodable, partially decodable where the PLCP (Physical Layer Convergence Procedure) header is decodable, and fully undecodable resulting in a collidable conflict. The allowable transitions between states are also labeled.

Where a long preamble is indicated the preamble is sent at 1 Mbps and is easily decodable so if the length field in the PLCP header is decodable then RTS/CTS can work correctly.

Long-term data may be used to discover the underlying state-space model. For instance, discovery of the underlying state-space for a given wireless system uses a combination of known data, spatially correlated data, and temporally learned data. Discovery generally starts by a basic identification of known wireless nodes or links, and then proceeds by filling in state data on configuration, performance, interference, conflicts, etc., as well as additionally discovered wireless nodes, communications links, or states.

The state space can be discovered over a long time period with a learning process using a large-scale database, observing state changes over time, state changes due to control changes, etc. Discovery can use active learning strategies by intentionally changing some state(s), or discovery can passively observe state changes due to external influences. States may also merge or be hierarchically split.

There is a historical evolution of states, including faults and traffic bottlenecks. State transitions may be caused due to control actions induced by an access point optimizer. Other changes to communications nodes may occur outside the control of the access point optimizer, due to external noise, or due to interference for uncontrolled communications nodes.

The reverse engineering or discovery of the underlying state-space may be accomplished through a combination of passive, active, and historical data as well as correlations between these data. Multiple data signatures may be used, including signatures from location, physical-layer, MAC-layer, applications, etc. Physical topology information can also be imported to help estimate the state-space using GPS-determined locations, triangulation, DSL neighborhood information, etc.

Long-term data traces are stored and analyzed which are then used to further determine the behavior of time-varying effects and predict the timing of future events such as faults occurring at a particular time-of-day. In addition, long-term data traces enable analyzing behaviors that are dependent on station limitations such as max rate limit or sleep-mode constraint of smartphones as well as implementation limitations of stations where the limitations are dependent on product-type, model, and version of such stations. Long-term data traces further enables analyzing behaviors that are dependent on user activity patterns.

FIG. 4I illustrates an exemplary process flow 409 for data collection, discovery, and model creation. For instance, process flow 409 depicts seven exemplary phases beginning at block 481 where information is input from the access points or other communications nodes attached to the access point optimizer and under its control. At block 482, essential information on uncontrolled access points or other uncontrolled communications nodes is estimated via interpolation. At block 483, the collected data is analyzed by the access point optimizer to define the states that will be the basis of the model of the wireless network being analyzed. At block 484, interactions between states such as interference, association, communication ability, conflicts, faults, etc., are identified in the model by the access point optimizer. At block 485, allowable state transitions, and methods of performing or inducing such transitions, are identified. At block 486, parameters are changed to perform or induce state transitions, and new states, state transitions, and interactions are identified in the model by the access point optimizer. Lastly, at block 487, the model is refined using long-term observations with controlled changes and interactions stored in a database accessible to the access point optimizer.

A further technique for analyzing the state-space is "clustering," in which clusters of strongly interacting states or wireless communications nodes (e.g. wireless devices with high traffic and high interference) are identified. System identification and optimization may first proceed independently in each cluster, with final stages of estimation and optimization considering interactions between clusters.

These techniques may further be utilized to identify equipment limitations, for example by identifying smartphones which have power limitations and go into sleep mode.

Figure 4J:
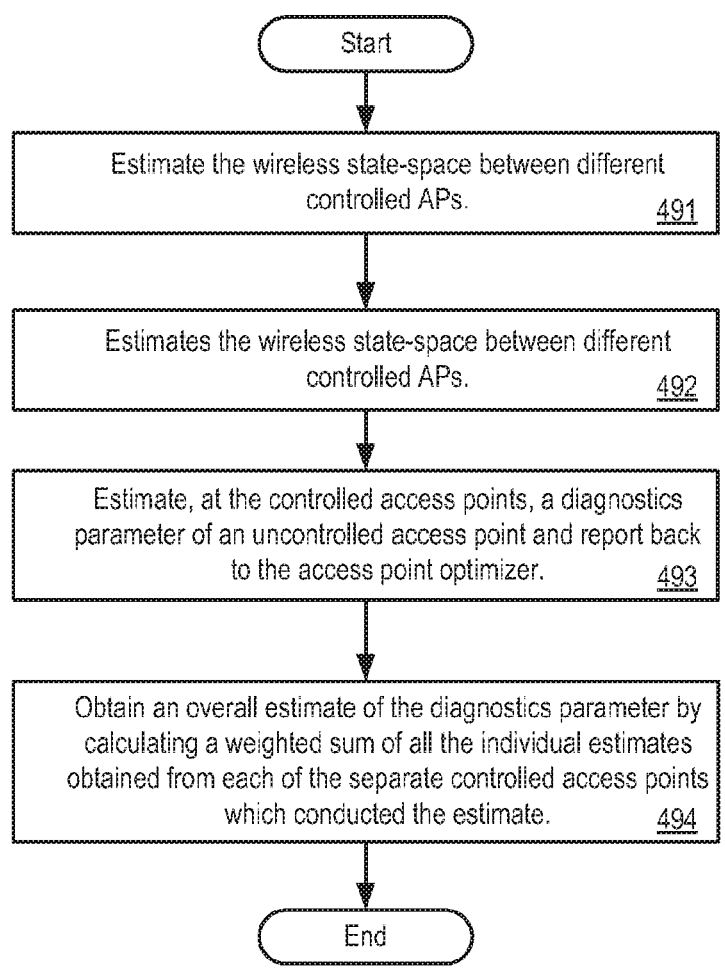
FIG. 4J illustrates an exemplary process flow for interpolation of parameters at uncontrolled access points in accordance with which embodiments may operate.

FIG. 4J illustrates an exemplary process flow 410 for interpolation of parameters at uncontrolled access points. The techniques described pertain to an environment where only some of the access points can provide data and be controlled by the access point optimizer. While it would be optimal for all access points within a given wireless environment to be under the control of the access point optimizer, such a scenario is highly unlikely in the field. Instead, it is very like that other "alien" access points will be intermingled with the controllable access points and which both cannot be directly controlled by the access point optimizer and which do not report data to the access point optimizer.

Nevertheless, many of these alien access points may be identified and at least partial data can be inferred. One example way of inferring data about these alien access points is via interpolation, as defined in the following exemplary interpolation algorithm. Interpolation weight selection can benefit from the learning of data modeled and stored in the state space database.

The process flow for interpolation of parameters at uncontrolled access points begins at block 491 to estimate the wireless state-space between different controlled APs. At block 492, processing logic estimates the wireless state-space between different controlled APs. At block 493, the access point optimizer causes controlled access points to estimate a diagnostics parameter, such as levels of received signals and interference, of an uncontrolled access point, and report back to the access point optimizer accordingly. Such an estimate can be based on scan data, received signal power at multiple nearby access points, received interference levels, etc. At block 494, processing logic obtains an overall estimate of the diagnostics parameter by calculating a weighted sum of all the individual estimates obtained from each of the separate controlled access points which conducted the estimate. The weighting can be proportional to received signal power at each estimating AP, distance to each estimated AP, etc. For example, the RSSI of a station at APi, RSSI.sub.i, may be estimated as the weighted sum of the RSSI, RSSI.sub.j, of nearby APs, where the weights are calculated by the information in the state-space database.

Interpolation, as it pertains to the mathematical field of numerical analysis, is a method of constructing new data points within the range of a discrete set of known data points. In engineering and science, one often has a number of data points, obtained by sampling or experimentation, which represent the values of a function for a limited number of values of the independent variable. It is often required to interpolate, that is, to estimate, the value of that function for an intermediate value of the independent variable, for instance, via curve fitting or regression analysis.

Figure 4K:
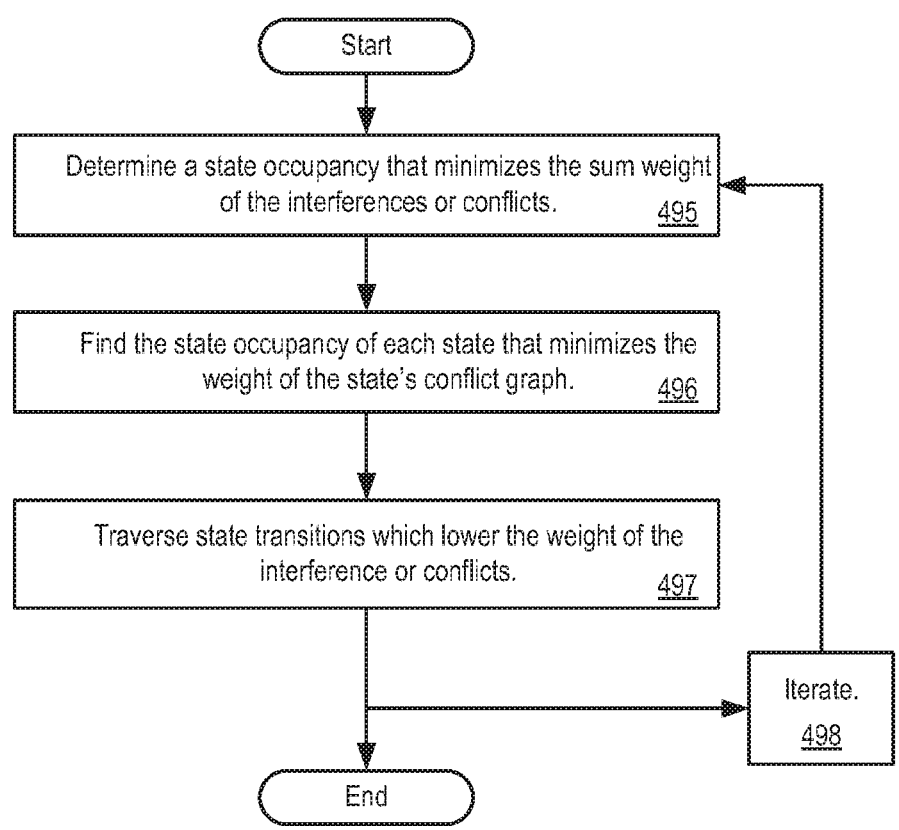
FIG. 4K illustrates an exemplary process flow for implementing a generalized optimization formulation by the access point optimizer in accordance with which embodiments may operate.

FIG. 4K illustrates an exemplary process flow 411 for implementing a generalized optimization formulation by the access point optimizer. For instance, beginning at block 495, processing logic determines a state occupancy that minimizes the sum weight of the interferences or conflicts. At block 496, processing logic finds the state occupancy of each state that minimizes the weight of the state's conflict graph. And at block 497, processing logic traverses state transitions which lower the weight of the interference or conflicts. At block 498, the process iterates as necessary.

It is preferable to avoid locally optimal solutions for any given access point given that the access point optimizer seeks generally to improve the overall wireless environment and not simply improve operations for a single access point. At the same time, it can be somewhat cumbersome to avoid locally optimal solutions because the interferences or conflicts and state transitions define two different adjacency matrices. Accordingly, it is sometimes more efficient to simply skip certain state transitions and instead directly go to the state occupancy that minimizes conflict or interference. Such an approach also has external constraints because each communication link must be occupied to some extent.

Iterative solutions are practical and may prove to be more efficient. Additionally, iterative solutions are generally less complex. Optimizations may further be achievable by decomposing the state space into separate clusters with no or minimal interaction in between them.

The modeling schemes, the access point optimizer, and the database described may be used for additional related purposes. One such purpose is to control adaptive handoff and to enable a connection decision policy between WiFi and cellular 3G/4G networks using the given location and performance history. Access points can be adaptively assigned space/time channels based on performance history and learning over time. This may be performed iteratively using the concept of 'try and learn,' through which the database may be further populated and enhanced. Embodiments can provide expected performance for any WiFi station at a known location. The system may provide location-based performance prediction services which can be useful when users are at a new location and want to know if free WiFi is giving expected performance. When a WiFi station's performance is much worse than expected, then it may be concluded that there is a configuration, external noise, or unusual congestion type of problem. This is called "expected performance based diagnostics."

Figure 5:
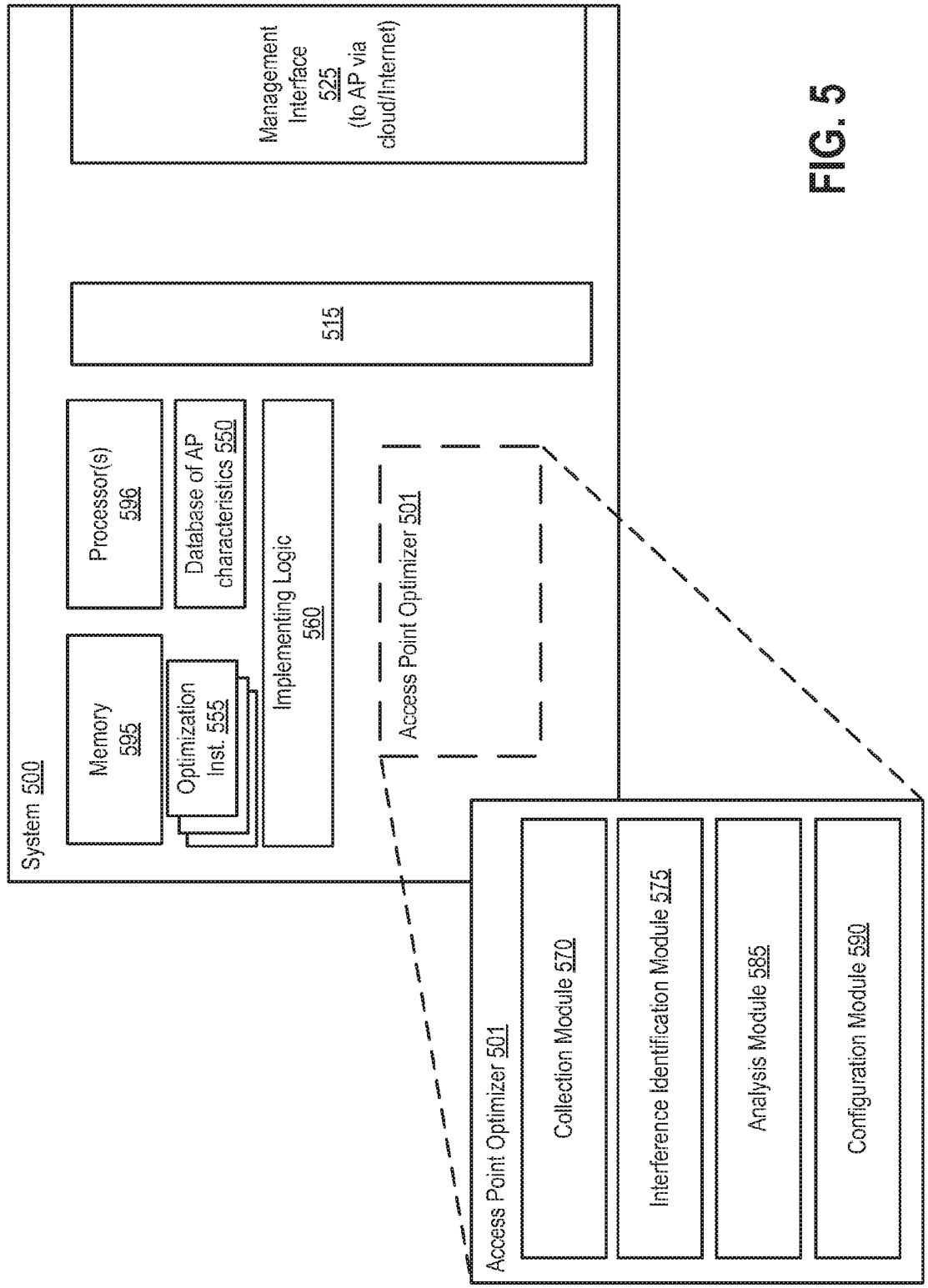
FIG. 5 illustrates a diagrammatic representations of a system in accordance with which embodiments may operate, be installed, integrated, or configured.

FIG. 5 illustrates a diagrammatic representations of a system 500 in accordance with which embodiments may operate, be installed, integrated, or configured.

In one embodiment, system 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. System 500 further includes management interface 525, for example, to receive requests, return responses, and otherwise interface with network elements located separately from system 500.

In some embodiments, management interface 525 communicates information via an out-of-band connection separate from wireless based communications such as WiFi, etc., where "in-band" communications are communications that traverse the same communication means as payload data (e.g., content) being exchanged between networked devices and where "out-of-band" communications are communications that traverse a different communication means, separate from the mechanism for communicating the payload data. An out-of-band connection may serve as a redundant or backup interface over which to communicate control data between the system 500 and other networked devices or between the system 500 and a third party service provider. In accordance with certain embodiments, system 500 communicates with remote wireless access points via the management interface 525 only and has no means by which to wirelessly communicate with the wireless access points.

System 500 may implement functionality to interface with remote wireless access points via the management interface 525 thus enabling the system 500 to monitor the wireless access points as well as communications, faults, performance, and other characteristics associated with such wireless access points.

System 500 further includes a database of AP characteristics 550 that may be analyzed or referenced when conducting analysis such as performance estimation and predictions iterative optimization of remote wireless access points and other functions. System 500 may further include multiple optimization instructions 555, any of which may be initiated responsive to analysis of data collected from the remote wireless access points. For example, corrective actions, additional diagnostics, information probes, configuration change requests, local commands, remote execution commands, and the like may be specified by and triggered as optimization instructions 555. The database of AP characteristics 550 and the optimization instructions 555 may be stored upon a hard drive, persistent data store, a database, or other storage location within system 500.

Distinct within system 500 is access point optimizer 501 which includes collection module 570, interference identification module 575, analysis module 585, and configuration module 590. Access point optimizer 501 may be installed and configured in a compatible system 500 as is depicted by FIG. 5, or provided separately so as to operate in conjunction with appropriate implementing logic 560 or other software.

In accordance with one embodiment there is a system 500 having a processor 596 and a memory 595 therein, in which the system 500 further includes: an interface 525 to a wireless access point, for instance, via the cloud or Internet. In accordance with such an embodiment, the interface 525 is established to a wireless access point. In such an embodiment, the system 500 further includes an interference identification module 575 to identify one or more interfering wireless nodes exhibiting electromagnetic interference upon the wireless access point; a collection module 570 to collect data from the wireless access point; an analysis module 585 to determine a model of the wireless access point and the one or more interfering wireless nodes by: (i) modeling communicative properties among the wireless access point and the one or more interfering wireless nodes exhibiting electromagnetic interference upon the wireless access point based at least in part on the data collected, and by further (ii) modeling an active state of the wireless access point representing a current configuration of the wireless access point having therein one or more configurable parameters for the wireless access point based at least in part on the data collected. According to such an embodiment of the system 500, the analysis module 585 is to further quantify a change in performance of the wireless access point or the one or more interfering wireless nodes based on a state change affecting the model.

In accordance with another embodiment, the system 500 implements an access point optimizer 501. According to one embodiment, the access point optimizer 501 further includes a configuration module 590 to effect a modeled state transition at the wireless access point by sending instructions from the access point optimizer to the wireless access point, the instructions specifying one or more of the configurable parameters to be altered at the wireless access point. According to another embodiment, the access point optimizer is embodied within a self-optimizing access point and the interfaced wireless access point from which the data is collected is the self-optimizing access point. That is to say, the self-optimizing access point interfaces to and then collects data from, itself, as part of a self-optimization procedure consistent with the embodiments described herein.

Figure 6:
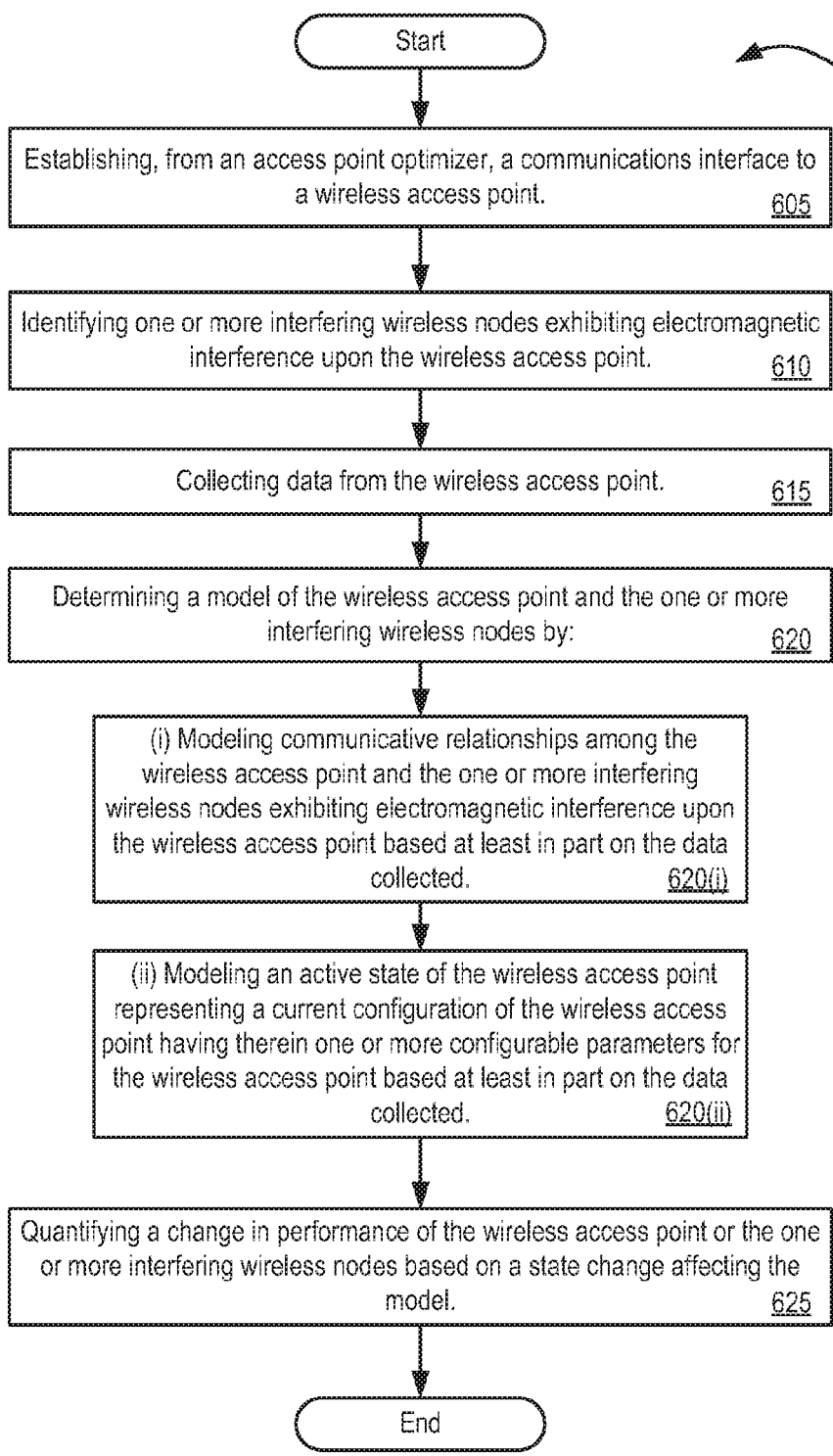
FIG. 6 is a flow diagram illustrating a method for implementing wireless system discovery and control using a state-space in accordance with described embodiments.

FIG. 6 is a flow diagram illustrating a method 600 for implementing wireless system discovery and control using a state-space in accordance with described embodiments. Method 600 may be performed by processing logic that may include hardware (e.g., circuitry, dedicated logic, programmable logic, microcode, etc.), software (e.g., instructions run on a processing device to perform various operations such as interfacing functions, identifying, collecting, modeling, quantifying, monitoring, estimating, selecting, assigning, configuring, diagnosing and reporting information, executing/initiating optimization instructions, calculations, or some combination thereof). In one embodiment, method 600 is performed or coordinated via an access point optimizer such as that depicted at element 201 of FIGS. 2 and 3 and at element 501 of FIG. 5. Some of the blocks and/or operations listed below are optional in accordance with certain embodiments. The numbering of the blocks presented is for the sake of clarity and is not intended to prescribe an order of operations in which the various blocks must occur. Additionally, operations from method 600 may be utilized in a variety of combinations with any of the other process flows and their respective operations, including process flow 101 and process flows 409, 410, and 411.

At block 605, processing logic establishes, from an access point optimizer, a communications interface to a wireless access point.

At block 610, processing logic identifies one or more interfering wireless nodes exhibiting electromagnetic interference upon the wireless access point.

At block 615, processing logic collects data from the wireless access point. At block 620, processing logic determines a model of the wireless access point and the one or more interfering wireless nodes. The model is determined according to blocks 620(*i*) and 620(*ii*). In particular, at block 620(*i*) the model is determined by: (i) modeling communicative relationships among the wireless access point and the one or more interfering wireless nodes exhibiting electromagnetic interference upon the wireless access point based at least in part on the data collected, and at block 620(*ii*) the model is determined by: (ii) modeling an active state of the wireless access point representing a current configuration of the wireless access point having therein one or more configurable parameters for the wireless access point based at least in part on the data collected.

At block 625, processing logic quantifies a change in performance of the wireless access point or the one or more interfering wireless nodes based on a state change affecting the model.

One or more of steps 605-625 may be repeated, so that the model and the performance are iteratively optimized.

According to the described embodiments, quantifying a change may result in quantifying a change in performance of the wireless access point or alternatively may result in quantifying a change for the one or more interfering wireless nodes, but it is not necessary that both occur or that only the former occur or only the latter occur. Thus, the change in performance may occur on the wireless access point, or it may occur on the other wireless node which interferes with the wireless access point.

According to one embodiment, the access point optimizer models a wireless AP, estimates performance, picks an improved state transition, implements the transition, and processing ends. In another embodiment, the access point optimizer models the wireless AP, actually conducts transitions by causing the wireless AP to implement state transitions, the access point optimizer measures performance of the wireless AP, captures the results in the model, and then implements the preferred or best transition with the wireless AP, after which processing ends. In yet another embodiment, the access point optimizer further implements configuration changes at one or more of the interfering nodes for which the access point optimizer has control, for instance, via a management interface between the access point optimizer and the interfering node.

According to another embodiment, quantifying a change in performance of the wireless access point or the one or more interfering wireless nodes based on a state change affecting the model includes at least one of: (a) a change in configuration of the wireless access point or the one or more interfering wireless nodes; (b) a change in traffic levels of the wireless access point or the one or more interfering wireless nodes; and (c) a change in one or more performance metrics measured by the wireless access point or the one or more interfering wireless nodes.

According to another embodiment, modeling communicative relationships among the wireless access point and the one or more interfering wireless nodes exhibiting electromagnetic interference upon the wireless access point includes: establishing nodes within the model representing communication links between any two or more of the wireless nodes; and establishing nodes within the model representing interference between any two or more of the wireless access point and the one or more interfering wireless nodes.

A wireless node may define a node in the state-space. Additionally, a communication link, for instance, between a wireless access point and a wireless node, can also define a node in the state-space according to graph theory.

According to another embodiment, the method further includes optimizing performance of wireless networks across the wireless access point and the identified one or more interfering nodes exhibiting electromagnetic interference upon the wireless access point by: constructing a state space from the model that describes the wireless access point and the identified one or more interfering nodes as device nodes and transmission related parameter settings for each of the device nodes for a radio environment within which the wireless networks operate; and populating the set of transitions within the state space with allowable state transitions corresponding to possible changes to the transmission related parameter settings for each of the device nodes, in which the allowable state transitions affect interactions between the device nodes within the radio environment, the allowable state transitions denoted by a set of graph edges among the device nodes within the state space, the graph edges representative of at least interference and state relationships between the device nodes of the state space.

According to another embodiment, the optimizing performance includes at least one of: changing a profile of one or more of the device nodes in the state space to improve an overall performance metric that is a statistical function of the performance of the wireless access point and all of the identified one or more interfering nodes modeled; and changing a profile of one or more of the device nodes in the state space to improve an overall performance metric according to a mathematical method of finding a fixed-point solution.

According to another embodiment, constructing a state space further includes one or both of: including interference to define the state-space and including associations among the device nodes to define the state-space.

According to another embodiment, constructing a state space further includes: defining explicit state relationships among the device nodes with explicit state variables selected from the group including: an ability to fully communicate with other wireless communications nodes; an ability to communicate at the basic rate with other wireless communications nodes; an ability to carrier sense other wireless communications nodes; and an electromagnetic interference with other wireless communications nodes.

For instance, "fully" and "basic rate" and "carrier sense" may be as a single state variable, which defines a variable level of communications ability from communication at max bit rate to pure interference.

According to another embodiment, determining the model further includes: (iii) modeling one or more state transitions of the wireless access point, in which each of the one or more state transitions includes a change to at least one of the configurable parameters for the wireless access point updated within the model.

According to another embodiment, quantifying the change in performance of the wireless access point includes:

estimating the effect on performance of the wireless access point within the model based on at least one of the modeled state transitions for the wireless access point and based further on an estimated change to the electromagnetic interference exhibited upon the wireless access point by the one or more interfering wireless nodes.

According to another embodiment, the method further includes: selecting one of the modeled state transitions of the wireless access point having an estimated effect on performance above a threshold; and effecting the selected modeled state transition at the wireless access point by sending instructions from the access point optimizer to the wireless access point, the instructions specifying one or more of the configurable parameters to be altered at the wireless access point.

According to another embodiment, quantifying the change in performance of the wireless access point includes: sending instructions to the wireless access point to alter one or more of the configurable parameters at the wireless access point according to one of the state transitions modeled; collecting updated data from the wireless access point; and determining a quantified change in performance of the wireless access point based on a comparison of the data from the wireless access point collected during an original state of the wireless access point and the updated data from the wireless access point after the state transition.

According to another embodiment, the method further includes: iteratively performing the sending instructions, the collecting updated data, and the determining, for each of the one or more state transitions modeled for wireless access point; and updating each of the one or more nodes or state transitions in the model based on the updated data from the wireless access point for the respective state transition According to another embodiment, the method further includes: selecting one of the modeled state transitions of the wireless access point having a determined quantified change in performance above a threshold; and effecting the selected modeled state transition at the wireless access point by sending instructions from the access point optimizer to the wireless access point, the instructions specifying one or more of the configurable parameters to be altered at the wireless access point.

According to another embodiment, the wireless access point creates a Local Area Network (LAN) for one or more wireless nodes communicatively interfaced to the wireless access point; and in which the one or more interfering wireless nodes exhibiting electromagnetic interference upon the wireless access point operate external to the LAN created by the wireless access point.

According to another embodiment, establishing, from the access point optimizer, a communications interface to a wireless access point, includes at least one of: communicating with the wireless access point via a hard-wired backhaul connection for the wireless access point; communicating with the wireless access point via a public Internet; communicating with an administrative interface of the wireless access point via an Internet Protocol (IP) address and port exposed to the public Internet; and communicating with the wireless access point via the hard-wired backhaul connection which provides Wide Area Network (WAN) or public Internet access for the wireless access point.

According to another embodiment, the wireless access point is a small-cell base station and the one or more interfering wireless nodes exhibiting electromagnetic interference upon the wireless access point each are selected from the group including: a third generation (3G) compatible device; a fourth generation (4G) compatible device; a Long Term Evolution (LTE) compatible device; another small-cell base station; a wireless femtocell base station; a wireless mobile device repeater overlapping in frequency with the small-cell base station; and a wireless mobile device base station overlapping in frequency with the small-cell base station.

According to another embodiment, the wireless access point is a WiFi compatible wireless access point and the one or more interfering wireless nodes exhibiting electromagnetic interference upon the wireless access point each are selected from the group including: another WiFi compatible wireless access point; a WiFi compatible wireless router; a WiFi compatible wireless gateway; a wireless in-home metering communication device; a wireless femtocell base station; a WiFi compatible base station; a wireless mobile device repeater overlapping in frequency with the WiFi compatible wireless access point; a wireless mobile device base station overlapping in frequency with the WiFi compatible wireless access point; an Ethernet connected wireless router overlapping in frequency with the WiFi compatible wireless access point; and an Ethernet connected wireless bridge overlapping in frequency with the WiFi compatible wireless access point.

WiFi and cellular are generally in separate frequency bands, and as such, they typically do not interfere with one another. Accordingly, the optimization would likely be applied to a WiFi type wireless device and other devices that communicate using common WiFi frequency bands or be applied alternatively to various cellular technologies (3G, 4G, LTE), and other devices that communicate using frequency bands that share the cellular communication space.

According to another embodiment, modeling communicative relationships among the wireless access point and the one or more interfering wireless nodes includes identifying one or more of: allowable transitions between states of the wireless access point or any of the one or more interfering wireless nodes, or both; a change in the electromagnetic interference corresponding to a state change of the wireless access point or any of the one or more interfering wireless nodes, or both; conflicts between the wireless access point and any of the one or more interfering wireless nodes corresponding to a state change of the wireless access point or any of the one or more interfering wireless nodes, or both; faults at the wireless access point or any of the one or more interfering wireless nodes corresponding to a state change of the wireless access point or any of the one or more interfering wireless nodes, or both; and associations of fault conditions at the wireless access point or any of the one or more interfering wireless nodes with a state change of the wireless access point or any of the one or more interfering wireless nodes, or both.

According to another embodiment, collecting the data from the wireless access point includes collecting performance diagnostics data, wireless environment data, and/or performance data for the wireless access point; and in which (ii) modeling an active state of the wireless access point includes modeling the active state from the data collected.

According to another embodiment, the method further includes modeling all possible state transitions of the wireless access point from the active state based on the configuration data collected and the one or more configurable parameters for the wireless access point.

According to another embodiment, the method further includes: establishing, from the access point optimizer, a second communications interface to a second wireless access point from among the one or more interfering wireless nodes exhibiting electromagnetic interference upon the first wireless access point.

According to another embodiment, the method further includes: applying the identifying, collecting, determining, and quantifying operations to the second wireless access point.

According to another embodiment, quantifying a change in performance of the wireless access point based on a state change affecting the model includes at least one of: modifying a configurable parameter of the first wireless access point and measuring a change to the electromagnetic interference at the second wireless access point; and modifying a configurable parameter of the second wireless access point and measuring a change to the electromagnetic interference at the first wireless access point.

According to another embodiment, the method further includes: applying clustering analysis to the model of the wireless access point and the one or more interfering wireless nodes by: clustering a problem space corresponding to the model into distinct groups or clusters of nodes or states; and dividing the problem space into sub-parts to decrease the computational complexity of determining the model.

For instance, the model may also naturally decompose into separate groups or clusters, with no interference between separate clusters.

According to another embodiment, clustering the problem space is based on one or more of physical address data, geographic location data, signal strength, and interference strength; for the respective one or more interfering wireless nodes.

According to another embodiment, identifying the one or more interfering wireless nodes is based on criteria selected from the group including: physical address data associating any of the one or more interfering wireless nodes with a physical premises within a threshold distance of the wireless access point; and geographic location data associating any of the one or more interfering wireless nodes with a geographic location within a threshold distance of the wireless access point.

According to another embodiment, a partial physical address is derived from the physical address data, the geographic location data, or both, for the respective one or more interfering wireless nodes; and in which the partial physical address is used to: identify the one or more interfering wireless nodes as being within a threshold geographic proximity to the wireless access point or to define distinct groups or clusters of nodes or states from the one or more interfering wireless nodes, or both.

For example, partial physical address data may include a derived zip code, or street name, or street number, etc., with the information being derived from geo-location data or address data, derived from DSL neighborhood data, etc.

According to another embodiment, quantifying a change in performance of the wireless access point based on a state change affecting the model, includes: (i) applying a change to the configurable parameters of the wireless access point or applying a profile specifying changes to the configurable parameters to the wireless access point to transition to the wireless access point to a new state for evaluation, the new state selected from one of: (a) a previously un-evaluated state, (b) a previously discovered state having only partial data, and (c) a previously discovered state having expired data; (ii) collecting updated data from the wireless access point while operating in the new state; and (iii) evaluating performance of the wireless access device's operation in the new state.

According to another embodiment, the method further includes: (iv) iterating operations (i) through (iii) for multiple new states until convergence is achieved according to at least one of: (a) the active state of the wireless access point is determined as being a best possible configuration among the active state and the new states evaluated for the wireless access point for a predetermined period of time, (b) the active state of the wireless access point is determined as being a best possible configuration among the active state and the new states evaluated for the wireless access point after a predetermined quantity of iterating operations (i) through (iii), and (c) the iterating of operations (i) through (iii), exceeds a pre-determined time threshold allowed; and (v) exiting the iterating of operations (i) through (iii) after convergence.

For instance, parameter settings or profiles may be applied to explore undiscovered states and their corresponding performance, for at least a period of time, as part of the learning or "discovery" process by which the access point optimizer "learns" about the wireless environment being evaluated and through which the model is improved.

According to another embodiment, identifying the one or more interfering wireless nodes includes: identifying foreign wireless devices for which the access point optimizer lacks direct control; and incorporating the foreign wireless devices identified into the model. Such "foreign" nodes are also referred to as "alien" nodes.

According to another embodiment, the model further includes: identifying parameters that are not directly readable related to the foreign wireless devices identified via interpolation; and incorporating the parameters that are not directly readable identified for the foreign wireless devices into the model.

According to another embodiment, the one or more configurable parameters for the wireless access point are selected from the following: radio link connection settings affecting the wireless access point or any of the one or more interfering nodes; channel assignments affecting the wireless access point or any of the one or more interfering nodes; connection assignments affecting the wireless access point or any of the one or more interfering nodes; Quality of Service (QoS) classifications at the wireless access point or any of the one or more interfering nodes; admission control parameters for controlling a traffic flow of data packets at the wireless access point or any of the one or more interfering nodes; and fairness criteria for traffic processed by the wireless access point or any of the one or more interfering nodes.

According to another embodiment, the method further includes: performing an optimization of the model by traversing successive state transitions toward an optimal solution; and applying the optimal solution to the wireless access point and the identified one or more interfering nodes.

Performance of the optimization of the model may be performed in-situ in an iterative manner that incorporates a feedback loop which alternates between performing changes and inputting measurements.

According to another embodiment, the method further includes: updating the model according to at least one of the following operations: directly changing one or more state variables for the wireless access point or any of the one or more interfering wireless nodes in the model; indirectly affecting one or more state variables for the wireless access point or any of the one or more interfering wireless nodes in the model by directly changing state variables of another device within the model;

According to another embodiment, the method further includes: performing one or more control actions from the access point optimizer to vary any of the one or more configurable parameters of the wireless access point or configurable parameters of any of the one or more interfering wireless nodes according to corresponding changes in the model. In certain embodiments, the control actions are performed iteratively or repetitively.

According to one embodiment, there is a non-transitory computer readable storage medium having instructions stored thereon that, when executed by a processor in an access point optimizer, the instructions cause the access point optimizer to perform operations including: establishing, from the access point optimizer, a communications interface to a wireless access point; identifying one or more interfering wireless nodes exhibiting electromagnetic interference upon the wireless access point; collecting data from the wireless access point; determining a model of the wireless access point and the one or more interfering wireless nodes by: (i) modeling communicative relationships among the wireless access point and the one or more interfering wireless nodes exhibiting electromagnetic interference upon the wireless access point based at least in part on the data collected, and (ii) modeling an active state of the wireless access point representing a current configuration of the wireless access point having therein one or more configurable parameters for the wireless access point based at least in part on the data collected; and quantifying a change in performance of the wireless access point or the one or more interfering wireless nodes based on a state change affecting the model.

According to another embodiment, the parameter settings of the wireless communications nodes are configured via profile settings. In yet another embodiment, one or more of the interacting elements between wireless communications nodes is an intrinsic variable to the state-space. In another embodiment, traffic levels are used to define the state-space. For instance, traffic levels can be off, low, medium or high or a numeric value. In another embodiment, state is defined as the configuration of a communication node and in a related embodiment, states are defined as the configuration of multiple communication nodes. In one embodiment, states include at least associated stations. In another embodiment, state is defined as a communication link between each station and the associated wireless communications node. In another embodiment, state is defined as a communication link and the configuration parameters of the devices on the communication link. In another embodiment, the model is utilized to identify a conflict graph.

Figure 7:
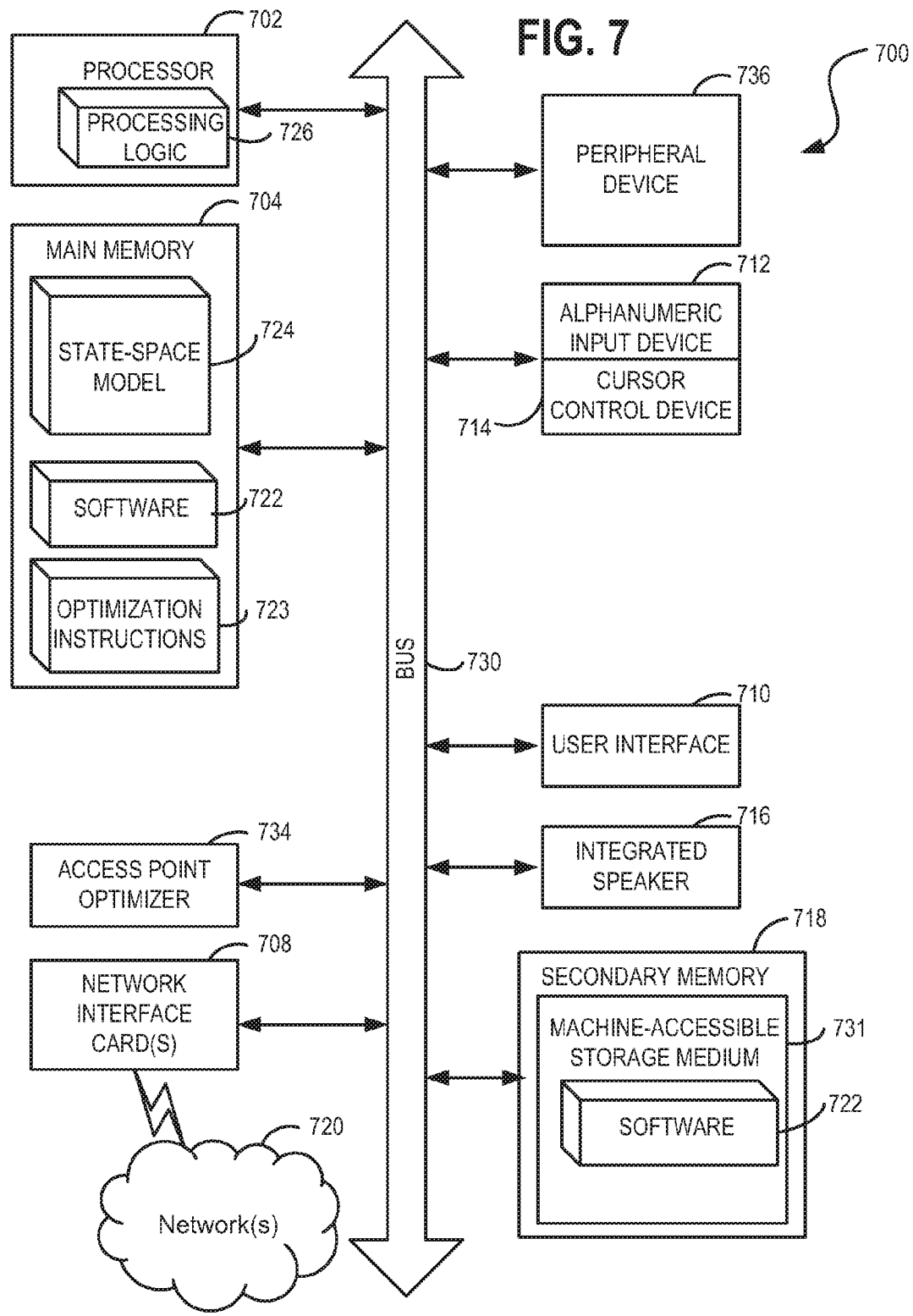
FIG. 7 illustrates a diagrammatic representation of a machine in the exemplary form of a computer system, in accordance with one embodiment.

FIG. 7 illustrates a diagrammatic representation of a machine 700 in the exemplary form of a computer system, in accordance with one embodiment, within which a set of instructions, for causing the machine 700 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and persistent data base implementations), which communicate with each other via a bus 730. Main memory 704 includes information and instructions and software program components necessary for performing and executing the functions with respect to the various embodiments of the systems, methods, and the access point optimizer 734 as described herein. Optimization instructions 723 may be triggered based on, for example, analysis of collected operational data, known access point statistics, known network equipment/access point capabilities and limitations, and so forth. State-space models 724 may be stored within main memory 704 for use in estimating and predicting operational characteristics of wireless system and environment undergoing evaluation. Optimization instructions 723 may be stored within main memory 704 and as collected and determined by access point optimizer 734. Main memory 704 and its sub-elements (e.g. 723 and 724) are operable in conjunction with processing logic 726 and/or software 722 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include one or more network interface cards 708 to communicatively interface the computer system 700 with one or more networks 720 from which information may be collected for analysis. For instance, network interface card 708 permits the computer system 700 to communicate via the cloud or over the Internet with a wireless access point to be optimized. The computer system 700 also may include a user interface 710 (such as a video display unit, a liquid crystal display (LCD), or a cathode ray tube (CRT)), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.). The computer system 700 may perform the functions of an access point optimizer 734 capable of interfacing with a wireless access point to be optimized, as well as modeling, monitoring, collecting, analyzing, and reporting information, and initiating, triggering, and executing various optimization instructions 723 including the execution of commands and instructions to alter characteristics and operation of a wireless access point to be optimized, etc.

The secondary memory 718 may include a non-transitory machine-readable storage medium (or more specifically a non-transitory machine-accessible storage medium) 731 on which is stored one or more sets of instructions (e.g., software 722) embodying any one or more of the methodologies or functions described herein. Software 722 may also reside, or alternatively reside within main memory 704, and may further reside completely or at least partially within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

The invention claimed is:

1. A method of modeling a state space for an access point optimizer, the method comprising:
   receiving data that identifies in a network one or more wireless nodes that cause an interference with a wireless access point;
   applying at least the received data to a model that comprises one or more graphs that model states in a state space that represents one or more wireless nodes associated with the wireless access point and at least one state variable that represents a configuration of the wireless access point, the one or more graphs identifying state transitions according to a state transition matrix;
   iteratively performing the steps of:
      adjusting at least one configurable parameter for the wireless access point to transition the wireless access point to operate in a new state defined by the state transition matrix;
      determining a change in at least one performance metric measured at one or more wireless access points; and
      updating the model.

2. The method of claim 1, wherein the change in at least one performance metric comprises at least one of:
   a change in a configuration of the wireless access point or one or more wireless nodes;
   a change in a traffic level of the wireless access point or the one or more wireless nodes;
   a change in interference of the wireless access point or the one or more wireless nodes; or
   a change in the at least one performance metric.

3. The method of claim 1, wherein the at least one state variable represents at least one of a communication link between wireless nodes and interference with two or more wireless access points.

4. The method of claim 1, wherein the new state comprises one of a previously un-evaluated state, a previously discovered state, a previously discovered state having only partial data, or a previously discovered state having expired data.

5. The method of claim 1, wherein the model describes the wireless access point and the one or more wireless nodes as device nodes having corresponding transmission related parameters.

6. The method of claim 5, further comprising using allowable state transitions to populate a set of state transitions that correspond to changes to the transmission, the allowable state transitions affecting interactions between the device nodes and being denoted by a set of graph edges among the device nodes within the state space, the graph edges being representative of at least interference and state relationships between the device nodes.

7. The method of claim 5, wherein modeling states in the state space further comprises using at least one of an interference between the one or more device nodes or an association between the one or more device nodes.

8. The method of claim 1, wherein modeling states in the state space further comprises:
   using state variables to define a level of communication among device nodes, the state variables being associated with at least one of an ability to:
   communicate with a wireless node;
   communicate with a wireless node at a basic rate;
   carrier sense a wireless node;
   cause an electromagnetic interference to or from a wireless node; and
   detect an electromagnetic interference to or from a wireless node.

9. The method of claim 1, wherein the wireless access point is a small-cell base station and the one or more wireless nodes comprise a least one of a third generation (3G) compatible device, a fourth generation (4G) compatible device, a Long Term Evolution compatible device, a second small-cell base station, a wireless femtocell base station, a wireless mobile device repeater overlapping in frequency with the small-cell base station, or a wireless mobile device base station overlapping in frequency with the small-cell base station.

10. The method of claim 1, wherein the wireless access point is a Wi-Fi compatible wireless access point and the one or more wireless nodes comprise at least one of a second Wi-Fi compatible wireless access point, a Wi-Fi compatible wireless router, a Wi-Fi compatible wireless gateway, a wireless in-home metering communication device, a wireless femtocell base station, a Wi-Fi compatible base station, a wireless mobile device repeater overlapping in frequency with the Wi-Fi compatible wireless access point, a wireless mobile device base station overlapping in frequency with the Wi-Fi compatible wireless access point, an Ethernet connected wireless router overlapping in frequency with the Wi-Fi compatible wireless access point, or an Ethernet connected wireless bridge overlapping in frequency with the Wi-Fi compatible wireless access point.

11. The model of claim 1, wherein modeling states comprises defining relationships among the one or more communication nodes by identifying one or more of:
   allowable state transitions between the one or more wireless access points or the one or more wireless nodes;

a change in electromagnetic interference with the one or more wireless access points or the one or more wireless nodes; and a fault condition at the one or more wireless access points or the one or more wireless nodes.

12. The method of claim 1, wherein the data comprises at least one of performance diagnostics data, wireless environment data, or performance data for the one or more wireless nodes.

13. The method of claim 1, wherein identifying the one or more wireless nodes is based on at least one of physical address data associating any of the one or more wireless nodes with a physical premises and geographic location data.

14. The method of claim 13, further comprising:
deriving a partial physical address from the physical address data, the geographic location data, or both; and
using the partial physical address to perform the steps of at least one of identifying the one or more wireless nodes as being within a geographic proximity of the wireless access point, or defining distinct groups or clusters of nodes or states from the one or more wireless nodes.

15. The method of claim 1, further comprising using an interpolation method to identify one or more parameters that are not directly readable related to foreign wireless devices and incorporating the one or more parameters into the model.

16. The method of claim 1, wherein the configurable parameter for the wireless access point comprises at least one of:
a radio link connection setting that affects the wireless access point or any of the one or more wireless nodes;
a channel assignment that affects the wireless access point or any of the one or more wireless nodes;
a connection assignment that affects the wireless access point or any of the one or more wireless nodes;
a Quality of Service (QoS) classification at the wireless access point or any of the one or more wireless nodes;
an admission control parameter for controlling a traffic flow of data packets at the wireless access point or any of the one or more wireless nodes; or
fairness criteria for traffic processed by the wireless access point or any of the one or more wireless nodes.

17. The method of claim 1, further comprising, in response to updating the model, applying one or more parameter settings to at least one wireless node.

18. A non-transitory computer readable storage medium having instructions stored thereon that, when executed by a processor in an access point optimizer, cause the access point optimizer to perform steps comprising:
receiving data that identifies in a network one or more wireless nodes that cause an interference with a wireless access point;
applying at least the received data to a model that comprises one or more graphs that model states in a state space that represents one or more communication nodes associated with the wireless access point and at least one state variable that represents a configuration of the wireless access point, the one or more graphs identifying state transitions according to a state transition matrix;
iteratively performing the steps of:
adjusting at least one configurable parameter for the wireless access point to transition the wireless access point to operate in a new state defined by the state transition matrix;
determining at least one performance metric measured at one or more wireless access points; and
based on the at least one performance metric; and
changing the configuration to induce a state transition that causes the interference to be reduced.

19. The non-transitory computer readable storage medium of claim 18, wherein the access point optimizer adjusts the at least one configurable parameter comprises based on the received data.

20. The non-transitory computer readable storage medium of claim 19, further comprising identifying the one or more wireless nodes by identifying wireless devices that are not directly controlled by the access point optimizer, and incorporating the identified wireless devices into the model.

* * * * *